(12) United States Patent
Lee et al.

(10) Patent No.: US 10,192,557 B2
(45) Date of Patent: Jan. 29, 2019

(54) ELECTRONIC DEVICE AND METHOD FOR VOICE RECOGNITION USING A PLURALITY OF VOICE RECOGNITION ENGINES

(71) Applicant: Samsung Electronics Co., Ltd., Gyeonggi-do (KR)

(72) Inventors: Sang-Hoon Lee, Gyeonggi-do (KR); Hyuk Kang, Gyeonggi-do (KR); Kyung-Tae Kim, Gyeonggi-do (KR); Seong-Min Je, Gyeonggi-do (KR); Seok-Yeong Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 40 days.

(21) Appl. No.: 14/915,068

(22) PCT Filed: Aug. 26, 2014

(86) PCT No.: PCT/KR2014/007951
§ 371 (c)(1),
(2) Date: Feb. 26, 2016

(87) PCT Pub. No.: WO2015/030474
PCT Pub. Date: Mar. 5, 2015

(65) Prior Publication Data
US 2016/0217795 A1 Jul. 28, 2016

(30) Foreign Application Priority Data
Aug. 26, 2013 (KR) .................. 10-2013-0101411

(51) Int. Cl.
*G10L 15/30* (2013.01)
*G10L 17/24* (2013.01)
(Continued)

(52) U.S. Cl.
CPC ............ *G10L 17/24* (2013.01); *G06F 1/3231* (2013.01); *G10L 15/22* (2013.01); *G10L 15/30* (2013.01);
(Continued)

(58) Field of Classification Search
CPC ...................................... G10L 15/30
See application file for complete search history.

(56) References Cited

U.S. PATENT DOCUMENTS 5,855,000 A * 12/1998 Waibel .................. G06K 9/03
382/186
6,070,140 A 5/2000 Tran
(Continued)

FOREIGN PATENT DOCUMENTS

| CN | 1365487 | 8/2002 |
|---|---|---|
| CN | 1158645 | 7/2004 |

(Continued)

OTHER PUBLICATIONS

PCT/ISA/210 Search Report issued on PCT/KR2014/007951 (pp. 3).

(Continued)

*Primary Examiner* — Jialong He
(74) *Attorney, Agent, or Firm* — The Farrell Law Firm, P.C.

(57) ABSTRACT

A method and an electronic device are provided for voice recognition. A method includes receiving a first voice by one of a first voice recognition device and a second voice recognition device; when the first voice is received by the first voice recognition device and the first voice recognition device recognizes a predetermined command in the first voice, transferring a received second voice to an external electronic device and recognizing the received second voice through the external electronic device; and when the first
(Continued)

voice is received by the second voice recognition device and the second voice recognition device recognizes the predetermined command in the first voice, recognizing a second command in the received second voice, and performing an operation based on the recognized second command.

20 Claims, 17 Drawing Sheets

(51) Int. Cl.
G10L 15/32 (2013.01)
G10L 15/22 (2006.01)
G10L 17/04 (2013.01)
G10L 17/06 (2013.01)
G10L 17/00 (2013.01)

(52) U.S. Cl.
CPC .............. *G10L 15/32* (2013.01); *G10L 17/00* (2013.01); *G10L 17/04* (2013.01); *G10L 17/06* (2013.01); *G10L 2015/223* (2013.01); *Y02D 10/173* (2018.01)

(56) References Cited

U.S. PATENT DOCUMENTS

| | | | |
|---|---|---|---|
| 6,185,535 B1 | 2/2001 | Hedin et al. | |
| 6,487,534 B1* | 11/2002 | Thelen | G10L 15/26 704/270 |
| 6,738,743 B2* | 5/2004 | Sharma | G10L 15/30 704/270 |
| 6,963,759 B1* | 11/2005 | Gerson | 455/414.1 |
| 7,386,454 B2* | 6/2008 | Gopinath | G10L 15/22 704/251 |
| 7,418,392 B1* | 8/2008 | Mozer | G10L 13/00 315/307 |
| 7,899,669 B2* | 3/2011 | Gadbois | G10L 15/32 379/88.01 |
| 8,340,975 B1* | 12/2012 | Rosenberger | G10L 15/22 704/270 |
| 2002/0046023 A1* | 4/2002 | Fujii | G10L 15/30 704/231 |
| 2002/0072905 A1* | 6/2002 | White | G10L 15/30 704/231 |
| 2003/0139924 A1* | 7/2003 | Balasuriya | G10L 15/30 704/231 |
| 2004/0034527 A1 | 2/2004 | Hennecke et al. | |
| 2004/0117179 A1 | 6/2004 | Balasuriya | |
| 2004/0122670 A1* | 6/2004 | Nuessle | G10L 15/04 704/251 |
| 2005/0071159 A1* | 3/2005 | Boman | G10L 21/0208 704/233 |
| 2005/0102142 A1* | 5/2005 | Soufflet | G10L 15/18 704/246 |
| 2006/0009980 A1* | 1/2006 | Burke | G10L 15/32 704/270 |
| 2006/0206331 A1* | 9/2006 | Hennecke | G10L 15/187 704/254 |
| 2007/0136059 A1* | 6/2007 | Gadbois | G10L 15/32 704/246 |
| 2009/0204409 A1* | 8/2009 | Mozer | G10L 15/30 704/275 |
| 2010/0004930 A1* | 1/2010 | Strope | G10L 15/32 704/240 |
| 2011/0015928 A1* | 1/2011 | Odell | G10L 15/30 704/257 |
| 2011/0054900 A1* | 3/2011 | Phillips | G10L 15/30 704/235 |
| 2011/0131043 A1* | 6/2011 | Adachi | G10L 15/08 704/246 |
| 2012/0010890 A1 | 1/2012 | Koverzin | |
| 2012/0179463 A1* | 7/2012 | Newman | G10L 15/30 704/231 |
| 2013/0080171 A1* | 3/2013 | Mozer | G10L 15/22 704/251 |
| 2013/0132084 A1* | 5/2013 | Stonehocker | G10L 15/30 704/244 |
| 2013/0339028 A1* | 12/2013 | Rosner | G10L 15/222 704/275 |
| 2014/0136215 A1* | 5/2014 | Dai | G10L 15/22 704/275 |
| 2014/0270259 A1* | 9/2014 | Goertz | G10L 25/84 381/110 |
| 2014/0309996 A1 | 10/2014 | Zhang | |
| 2014/0337032 A1* | 11/2014 | Aleksic | G10L 15/32 704/257 |
| 2015/0106085 A1* | 4/2015 | Lindahl | G10L 15/32 704/231 |

FOREIGN PATENT DOCUMENTS

| | | |
|---|---|---|
| CN | 1723487 | 1/2006 |
| CN | 103198831 | 7/2013 |
| JP | 2000-322078 | 11/2000 |
| KR | 10-2004-0072691 | 8/2004 |
| KR | 10-2010-0032140 | 3/2010 |
| KR | 10-2012-0066561 | 6/2012 |
| KR | 10-2013-0083371 | 7/2013 |

OTHER PUBLICATIONS

European Search Report dated Mar. 24, 2017 issued in counterpart application No. 14840410.6-1901, 12 pages.
Chinese Office Action dated Oct. 31, 2018 issued in counterpart application No. 201480047495.1, 28 pages.

* cited by examiner

ELECTRONIC DEVICE AND METHOD FOR VOICE RECOGNITION USING A PLURALITY OF VOICE RECOGNITION ENGINES

PRIORITY

This application is a U.S. National Stage Entry of International Application PCT/KR2014/007951, filed on Aug. 26, 2014, which claims priority to Korean Application No. 10-2013-0101411, filed on Aug. 26, 2013, the contents of each of which are incorporated herein by reference.

BACKGROUND

1. Technical Field the Disclosure

The present disclosure relates generally to an electronic device, and more particularly to a configuration of an electronic device for voice recognition.

2. Description of the Related Art

In general, people unique voices and the voice itself may be used to authenticate a person.

For example, a voice recognition device may recognize the voice of a particular person by using a voice recognition model having collected the voice of the particular person and information on the voice, which is commonly referred to as "speaker verification". A voice recognition device may also distinguish the voice of a speaker by using a voice recognition model trained in advance for recognizing voices of a plurality of people, which is commonly referred to as "speaker identification".

A voice recognition device using the speaker verification or the speaker identification may train the voice recognition model by using a particular phrase and, in this case, recognize a voice only when a particular speaker speaks the particular phrase, thereby having a higher security performance.

Further, a voice recognition device may recognize a voice by using an isolated word recognition method that recognizes only a predetermined particular word. The isolated word recognition method generates a template of each particular word and compares it with an input speech. The voice recognition device using the isolated word recognition method recognizes only a predetermined particular word, and thus, has a relatively high voice recognition rate and has a relatively low voice recognition failure rate due to background noise. Accordingly, the isolated word recognition method has fewer calculations and uses less memory as compared to Large Vocabulary Speech Recognition (LVSR), in which all speech can be converted into text, and natural voice recognition. Therefore, the isolated word recognition method can be easily used in a portable terminal device.

However, a conventional voice recognition device has a problem performing a voice recognition method having a large calculation amount, a low power processor is mounted therein.

Further, a conventional voice recognition device has a disadvantage of large power consumption when a high performance processor is mounted therein, because high performance pre-processing and high performance voice recognition are performed.

SUMMARY

Accordingly, the present disclosure is made to address at least the problems and/or disadvantages described above and to provide at least the advantages described below.

An aspect of the present disclosure is to provide an electronic device and a method for recognizing a voice by using a processor having low power consumption and a processor conducting high performance voice recognition.

In accordance with an aspect of the present disclosure, a method is provided for performing voice recognition by an electronic device including a first voice recognition device and a second voice recognition device. The method includes receiving a first voice by one of the first voice recognition device and the second voice recognition device; when the first voice is received by the first voice recognition device and the first voice recognition device recognizes a predetermined command in the first voice, transferring a received second voice to an external electronic device and recognizing the received second voice through the external electronic device; and when the first voice is received by the second voice recognition device and the second voice recognition device recognizes the predetermined command in the first voice, recognizing a second command in the received second voice, and performing an operation based on the recognized second command.

In accordance with another aspect of the present disclosure, a method is provided for performing voice recognition by an electronic device including a first voice recognition device and a second voice recognition device. The method includes executing a predetermined application; receiving a first voice for the application; determining whether voice recognition of the first voice can be performed by the first voice recognition device; when the voice recognition of the first voice can be performed by the first voice recognition device and the first voice recognition device recognizes a predetermined command in the first voice, transferring a received second voice to an external electronic device and recognizing the received second voice through the external electronic device; and when the voice recognition of the first voice cannot be performed by the first voice recognition device, performing the voice recognition by the second voice recognition device, and when the second voice recognition device recognizes the predetermined command in the first voice, recognizing a second command in the received second voice, and performing an operation based on the recognized second command.

In accordance with another aspect of the present disclosure, an electronic device is provided, which includes a first voice recognition device; and a second voice recognition device. When a first voice is received by the first voice recognition device and the first voice recognition device recognizes a predetermined command in the first voice, the first voice recognition device transfers a received second voice to an external electronic device and recognizing the received second voice through the external electronic device. When the first voice is received by the second voice recognition device and the second voice recognition device recognizes the predetermined command in the first voice, the second voice recognition device recognizes a second command in the received second voice, and performs an operation based on the recognized second command.

In accordance with another aspect of the present disclosure, an electronic device is provided, which includes a first voice recognition device; a second voice recognition device; and a processor for executing a predetermined application and determining whether voice recognition of a first voice can be performed by the first voice recognition device or the second voice recognition device. When the voice recognition of the first voice can be performed by the first voice recognition device and the first voice recognition device recognizes a predetermined command in the first voice, the first voice recognition device transfers a received second voice to an external electronic device and recognizes the received second voice through the external electronic device. When the voice recognition of the first voice cannot be performed by the first voice recognition device, the second voice recognition device performs the voice recognition, and when the second voice recognition device recognizes the predetermined command in the first voice, the second voice recognition device recognizes a second command in the received second voice and performs an operation based on the recognized second command.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1:
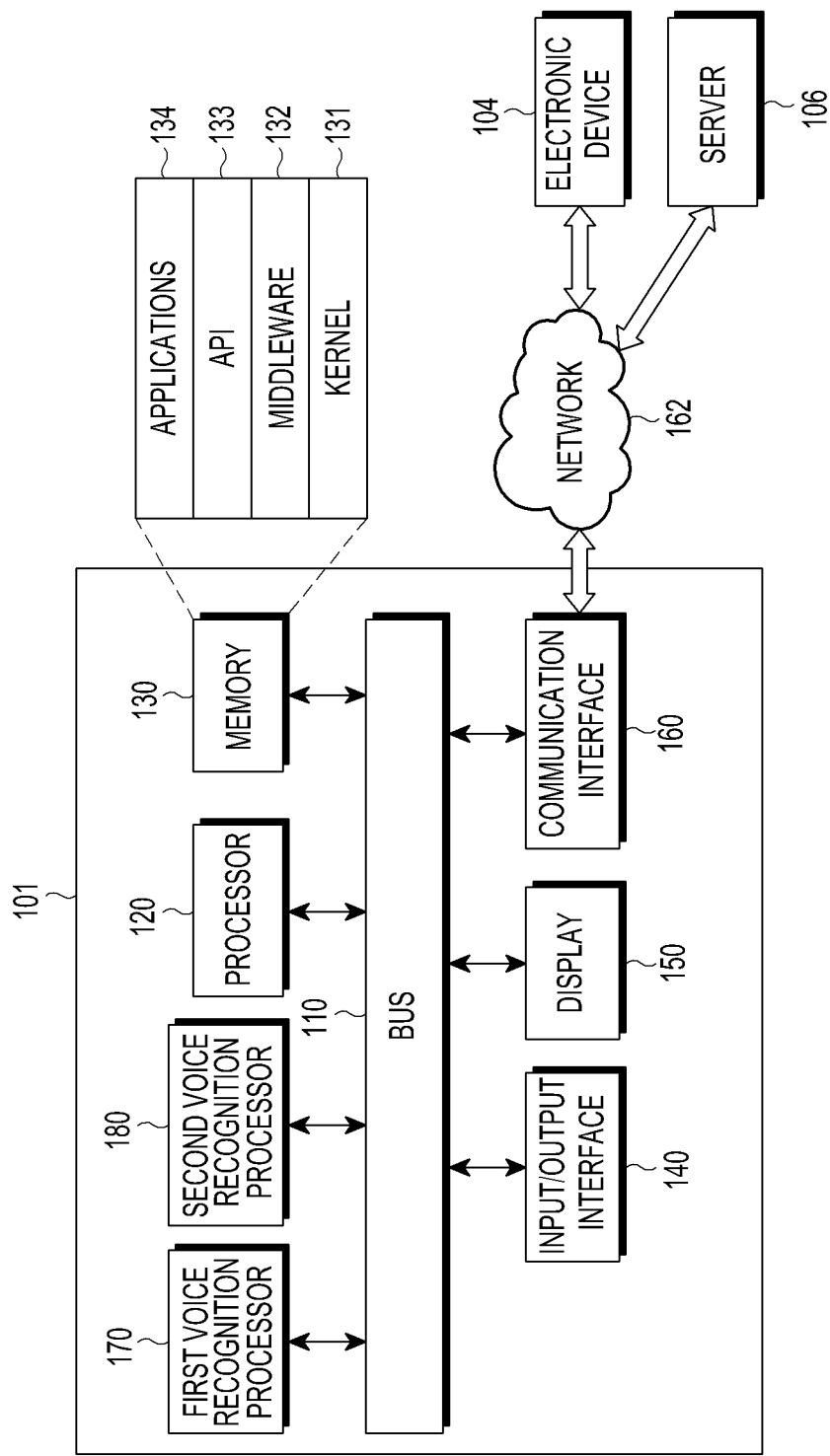
FIG. 1 illustrates a network environment including an electronic device according to an embodiment of the present disclosure.

Hereinafter, various embodiments of the present disclosure will be described in connection with the accompanying drawings. The present disclosure may be modified in various forms and include various embodiments, but specific examples are illustrated in the drawings and described in the description. However, the description is not intended to limit the present disclosure to these specific embodiments, and it shall be appreciated that all the changes, equivalents and substitutions belonging to the idea and technical scope of the present disclosure are included herein.

In the description of the drawings, identical or similar reference numerals may be used to designate identical or similar elements.

Hereinafter, the terms "have", "include" or "may include", refer to the presence of disclosed functions, operations, or elements, and do not restrict the addition of one or more functions, operations, or elements.

Herein, the term "or" means the inclusion of at least one or all of the disclosed elements. For example, the expression "A or B" may include A, may include B, or may include both A and B.

Expressions such as "first," "second," etc., may modify various component elements in the various embodiments but may not limit corresponding component elements. For example, the above expressions do not limit the sequence and/or importance of the elements. The above expressions are used merely for the purpose of distinguishing an element from the other elements. For example, a first user device and a second user device indicate different user devices, although both of them are user devices. For example, a first component element may be referred to as a second component element, and the second component element also may be referred to as the first component element.

If one component element, e.g., a first component element, is described as being "coupled" or "connected" to another component element, e.g., as second component element, the first component element may be directly coupled or connected to the second component, or a third component element may be "coupled" or "connected" therebetween. However, when the first component element is described as being "directly coupled" or "directly connected" to the second component element, no other component elements may exist therebetween.

As used herein, the singular forms are intended to include the plural forms as well, unless the context clearly indicates otherwise.

Unless defined differently, all terms used herein, which include technical terminologies or scientific terminologies, have the same meanings as understood by a person having ordinary skill in the art to which the present disclosure belongs. Terms such as those defined in a generally used dictionary are to be interpreted to have the same definitions as the contextual meanings in the relevant field of art, and are not to be interpreted to have ideal or excessively formal definitions unless clearly defined as such herein.

An electronic device according to an embodiment of the present disclosure may be a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device (e.g., a head-mounted-device (HMD), electronic glasses, electronic clothes, an electronic bracelet, an electronic necklace, an electronic appcessory, an electronic tattoo, or a smart watch).

The electronic device may also be a smart home appliance, e.g., a television (TV), a digital video disk (DVD) player, an audio player, a refrigerator, an air conditioner, a cleaner, an oven, a microwave, a washing machine, an air purifier, a set-top box, a TV box (e.g., Samsung HomeSync®, Apple TV®, or Google TV®), a game console, an electronic dictionary, electronic keys, a camcorder, or an electronic frame.

The electronic device may also be a medical device such as a magnetic resonance angiography (MRA) scanner, a magnetic resonance imaging (MRI) scanner, a computed tomography (CT) scanner, a scanner, an ultrasonograph, etc., a navigation device, a Global Positioning System (GPS) receiver, an Event Data Recorder (EDR), a Flight Data Recorder (FDR), a vehicle infotainment device, an electronic device for ship (for example, a ship navigation device, a gyro-compass, etc.), avionics, a security device, a head unit for a vehicle, an industrial or household robot, an automatic teller machine (ATM), a point of sales (POS) device in a store, or an Internet of Things (IoT) device.

The electronic device also may be furniture or a part of a building/structure, an electronic board, an electronic signature receiving device, a projector, or a measuring device (for example, a water meter, an electric meter, a gas meter, a radio wave meter, etc.).

Also, the electronic device may be a flexible device.

An electronic device according to an embodiment of the present disclosure may be a combination of one or more of above-described various devices.

Also, an electronic device according to an embodiment of the present disclosure is not limited to the above-described devices.

Hereinafter, the term "user" may refer to a person who uses an electronic device or a device (for example, an artificial intelligence electronic device) that uses an electronic device.

FIG. 1 illustrates a network environment including an electronic device according to an embodiment of the present disclosure.

Referring to FIG. 1, the electronic device 101 includes a bus 110, a processor 120, a memory 130, an input/output interface 140, a display 150, a communication interface 160, a first voice recognition processor 170, and a second voice recognition processor 180.

The bus 110 may be a circuit for connecting the above-described elements to each other and transferring communication (for example, control messages) between the elements.

The processor 120 may receive a command from the above-described other elements (for example, the memory 130, the input/output interface 140, the display 150, the communication interface 160, the first voice recognition processor 170, the second voice recognition processor 180, etc.) through, for example, the bus 110, decode the received command, and perform a calculation or data processing according to the decoded command.

The memory 130 may store commands or data received from or generated by the processor 120 or other elements (for example, the input/output interface 140, the display 150, the communication interface 160, the first voice recognition processor 170, the second voice recognition processor 180, etc.). The memory 130 includes programming modules, i.e., a kernel 131, a middleware 132, an Application Programming Interface (API) 133, and applications 134. Each of the aforementioned programming modules may be formed of software, firmware, hardware, or a combination of at least two thereof.

The kernel 131 may control or manage system resources (for example, the bus 110, the processor 120, the memory 130, etc.) used to perform operations or functions implemented in the remaining programming modules, for example, the middleware 132, the API 133, and the applications 134. Further, the kernel 131 may provide an interface through which the middleware 132, the API 133, and the applications 134 may access individual component elements of the electronic device 101 to control or manage the individual component elements.

The middleware 132 may serve as an intermediary for the API 133 or the applications 134 to communicate with the kernel 131 to transmit/receive data. Further, in relation to requests for an operation received from the applications 134, the middleware 132 may control (for example, schedule or load-balance) the requests for the operation by using a method of determining a sequence for using system resources (for example, the bus 110, the processor 120, the memory 130, etc.) of the electronic device 101 with respect to at least one application among the applications 134.

The API 133 is an interface by which the applications 134 control functions provided from the kernel 131 or the middleware 132, and may include, for example, at least one interface or function (for example, commands) for file control, window control, image processing, text control, etc.

The applications 134 may include a Short Message Service (SMS)/Multimedia Message Service (MMS) application, an e-mail application, a calendar application, an alarm application, a health care application (for example, an application for measuring a heart rate or blood sugar level), an environment information application (for example, an application for providing atmospheric pressure, humidity, or temperature information).

Additionally or alternately, the applications 134 may include an application related to information exchange between the electronic device 101 and an external electronic device 104. The application related to exchanging information may include a notification relay application for transferring predetermined information to the external electronic device, or a device management application for managing the external electronic device 104.

For example, the notification relay application may include a function of transferring notification information generated in other applications (for example, the SMS/MMS application, the e-mail application, the health care application, the environmental information application, etc.) of the electronic device 101 to the electronic device 104.

Additionally or alternatively, the notification relay application may receive notification information from the electronic device 104, and may provide the received notification information to a user.

The device management application may manage (for example, install, delete, or update) functions for at least a part of the electronic device 104 communicating with the electronic device 101 (for example, turning on/off the external electronic device 104 itself (or some elements thereof) or adjusting the brightness (or resolution) of a display), applications operating in the external electronic device 104, or services (for example, a telephone call service or a message service) provided by the external electronic device 104.

The applications 134 may also include an application, which is designated according to a property of the external electronic device 104 (for example, the type of electronic device 104). For example, when the external electronic device 104 is an MP3 player, the applications 134 may include an application relating to the reproduction of music. Similarly, when the external electronic device 104 is a mobile medical device, the applications 134 may include an application related to health care.

The applications 134 may also include an application designated in the electronic device 101 or an application received from a server 106 or the electronic device 104.

The input/output interface 140 may transfer commands or data input by a user through an input/output device (for example, a sensor, a keyboard, or a touch screen) to the processor 120, the memory 130, the communication interface 160, the first voice recognition processor 170, and a second voice recognition processor 180 through the bus 110. The input/output interface 140 may provide the processor 120 with data on a user touch input received through the touch screen. Further, the input/output interface 140 may output, through the input/output device (for example, a speaker or a display), the commands or data received from the processor 120, the memory 130, the communication interface 160, the first voice recognition processor 170, or the second voice recognition processor 180 through the bus 110. For example, the input/output interface 140 may output voice data processed by the processor 120 to the user through a speaker.

The display 150 may display various pieces of information (for example, multimedia data or text data) to a user.

The communication interface 160 may connect communication between the electronic device 101 and the external electronic device 104 or the server 106. For example, the communication interface 160 may be connected to a network 162 through wireless or wired communication to communicate with the external electronic device. The wireless communication may include Wireless Fidelity (Wi-Fi), Bluetooth (BT), Near Field Communication (NFC), Global Positioning System (GPS), and cellular communication (e.g., Long-Term Evolution (LTE), LTE-Advance (LTE-A), code division multiple access (CDMA), Wideband CDMA (WCDMA), Universal Mobile Telecommunications System (UMTS), Wireless Broadband (WiBro), Global System for Mobile Communications (GSM), etc.). The wired communication may include a Universal Serial Bus (USB), a High Definition Multimedia Interface (HDMI), Recommended Standard 232 (RS-232), and a Plain Old Telephone Service (POTS).

The network 162 may be a telecommunication network, e.g., a computer network, the Internet, the Internet of Things (IoT), and a telephone network.

A protocol (for example, a transport layer protocol, data link layer protocol, or a physical layer protocol) for communication between the electronic device 101 and the external electronic device 104 may be supported in at least one of the applications 134, the API 133, the middleware 132, the kernel 131, and the communication interface 160.

The first voice recognition processor 170 and/or the second voice recognition processor 180 may process at least some pieces of information acquired from other elements (for example, the processor 120, the memory 130, the input/output interface 140, the communication interface 160, etc.), and may provide the processed information to the user through various methods.

For example, the first voice recognition processor 170 may recognize a first voice received from the input/output interface 140 by using the processor 120, or independently from the processor 120, and determine whether a first command is included in the first voice. The first command may be preset by a particular word or may be set by the user.

When the first command is included in the first voice, the first voice recognition processor 170 may transfer an additionally received second voice to the external electronic device 104 or the server 106, and thus, the external electronic device 104 or the server 106 may perform voice recognition on the second voice.

Further, after the first voice is recognized and it is determined whether the first command is included in the first voice, when the first command is included in the first voice, the second voice recognition processor 180 may recognize the additionally received second voice and determine whether a second command included in a pre-stored voice command set is included in the second voice. The second command set may include a plurality of words.

When the second command is included in the second voice, the second voice recognition processor 180 may perform an operation corresponding to the second command. Alternatively, the second voice recognition processor 180 may transfer a signal for performing the operation corresponding to the second command to the processor 120, and thus, the processor 120 may perform the operation.

Figure 2:
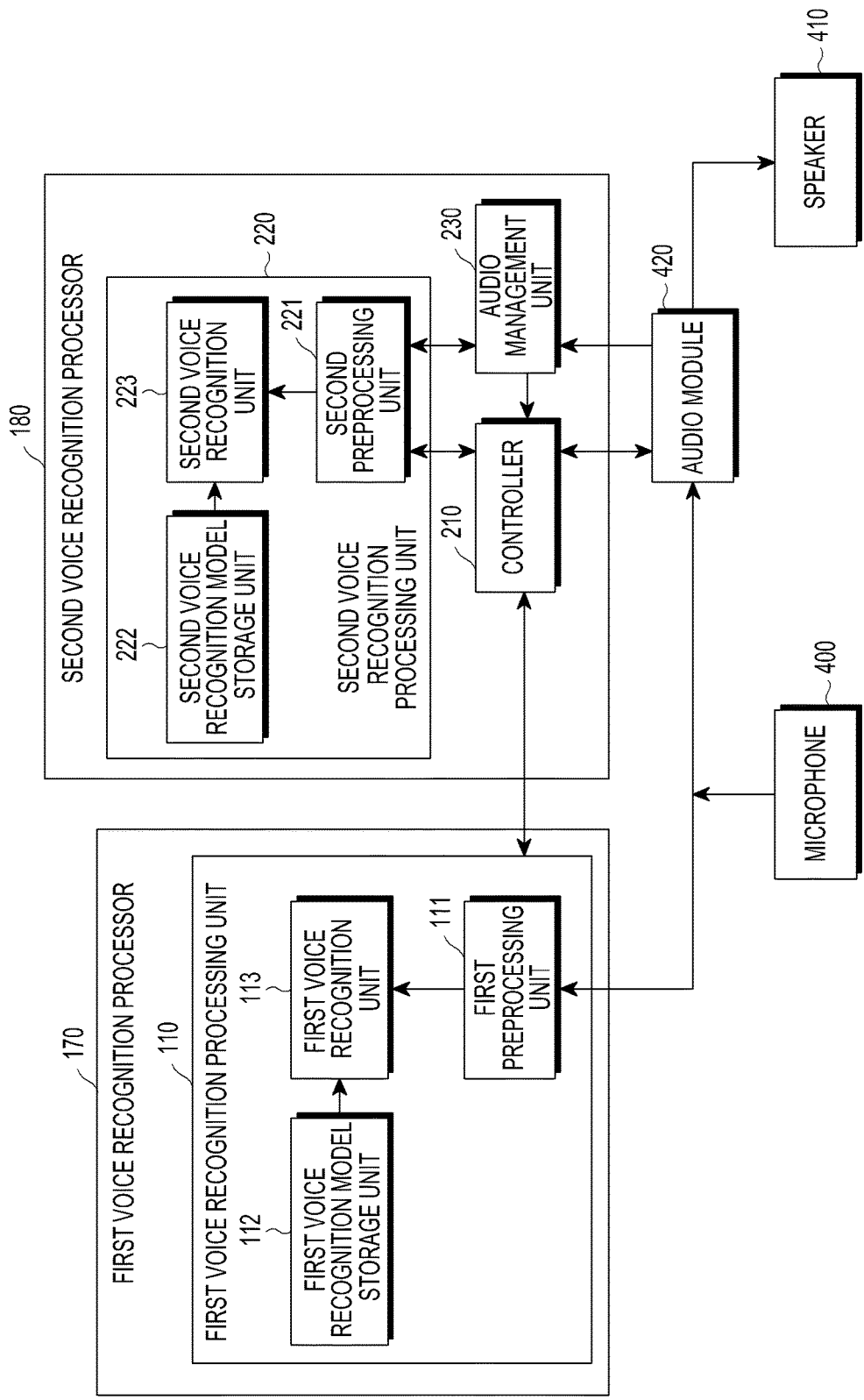
FIG. 2 illustrates an electronic device including a first voice recognition processor and a second voice recognition processor according to an embodiment of the present disclosure.

FIG. 2 illustrates an electronic device including a first voice recognition processor and a second voice recognition processor according to an embodiment of the present disclosure.

Referring to FIG. 2, the electronic device includes the first voice recognition processor 170, the second voice recognition processor 180, a microphone 400, a speaker 410, and an audio module 420.

The microphone 400 may receive a voice signal. Further, the microphone 400 may be referred to as a voice input unit.

The speaker 410 may output a voice signal and/or an audio signal generated by execution of an application or a program. Further, the speaker 410 may be referred to as an audio output unit.

The audio module 420 is connected to the first voice recognition processor 170, the second voice recognition processor 180, the microphone 400, and the speaker 410 to convert an analog voice signal into a digital voice signal or convert a digital voice signal into an analog voice signal. Further, the audio module 420 may perform signal processing on the converted digital signal, such as an automatic gain control, equalization, etc. The audio module 420 may transmit/receive a voice signal of an application or a program.

The audio module 420 may be separately implemented or may be selectively implemented. Alternatively, the audio module 420 may be implemented within each of the first voice recognition processor 170 and the second voice recognition processor 180.

The first voice recognition processor 170 includes a first voice recognition processing unit 110, which includes a first preprocessing unit 111, a first voice recognition model storage unit 112, and a first voice recognition unit 113. The voice recognition model storage unit 112 may also be referred to as a voice recognition engine storage unit.

Herein, the first voice recognition processor 170 corresponds to a low power processor, which operates with a relatively low power and performs voice recognition by using a first voice recognition model.

Before the first voice recognition unit 113 performs voice recognition, the first preprocessing unit 111 may modify a voice signal input from the microphone 400 and output the modified voice signal to the first voice recognition unit 113. The first preprocessing unit 111 may be selectively implemented or may be omitted according to an implementation.

The first voice recognition model storage unit 112 may store a first voice recognition model including various voice recognition algorithms used for voice recognition, and may be generated or updated by voice recognition training.

The first voice recognition model may include a first level voice recognition algorithm that recognizes a first level voice including a preset command such as a particular word or a combination of one or more words. For example, the first voice recognition model may be a speaker recognition algorithm.

The first voice recognition unit 113 may recognize a voice by using the first voice recognition model. The first voice recognition unit 113 may recognize the first level voice in the first voice recognition processor 170 that operates with low power. For example, the first voice recognition unit 113 may recognize a command including a combination of predetermined words such as, "Hi, Galaxy".

The second voice recognition processor 180 includes a second voice recognition processing unit 220, a controller 210, and an audio management unit 230. The second voice recognition processing unit 220 includes a second preprocessing unit 221, a second voice recognition model storage unit 222, and a second voice recognition unit 223. The audio management unit 230 may also be referred to as a voice management unit.

Here, the second voice recognition processor 180 may operate with different power from that of the first voice recognition processor 170.

The controller 210 controls general operations of the first voice recognition processor 170 or/and the second voice recognition processor 180, such as a voice recognition control, a signal control between respective elements, etc. Further, the controller 210 may receive a voice input/output signal from the audio management unit 230. The controller 210 may control operations of the first voice recognition processing unit 110 and the second voice recognition processing unit 220 by using application and program information, and information received from the audio management unit 230.

Although FIG. 2 illustrates the controller 210 being included in the second voice recognition processor 180, the present disclosure is not limited thereto and the controller 210 may be included in the first voice recognition processor 170 or may be configured separately from the first voice recognition processor 170 and the second voice recognition processor 180. Also, the first voice recognition processor 170 or/and the second voice recognition processor 180 may control each operation.

Before the second voice recognition unit 223 performs voice recognition, the second preprocessing unit 221 may modify a voice signal input from the microphone 400 and output the modified voice signal to the second voice recognition unit 223. The second preprocessing unit 221 may be selectively implemented or may be omitted according to an implementation.

The second voice recognition model storage unit 222 stores a second voice recognition model used for the voice recognition by the second voice recognition unit 223.

The second voice recognition model may include a second level voice recognition algorithm, which recognizes the first level voice that can be recognized by the first voice recognition model and a second level voice including a command of one word. The second level voice recognition algorithm may recognize more commands than the first level voice recognition algorithm. Further, the second voice recognition model may be generated or updated by voice recognition training.

The second voice recognition unit 223 may recognize the second level voice by using the second voice recognition model. The second voice recognition unit 223 may perform voice recognition with higher performance than the first voice recognition unit 113. For example, the second voice recognition unit 223 may recognize a command including of one word such as, "Play", "Stop", "Pause", etc.

The audio management unit 230 may be directly or indirectly connected to the microphone 400 and the speaker 410 to manage an input or output of the voice signal. Further, the audio management unit 230 may transfer the voice signal output from the audio module 420 to the second preprocessing unit 221. The audio management unit 230 may manage an input/output of the audio signal of the application or program and determine whether the audio signal is output from the speaker 410.

Figure 3:
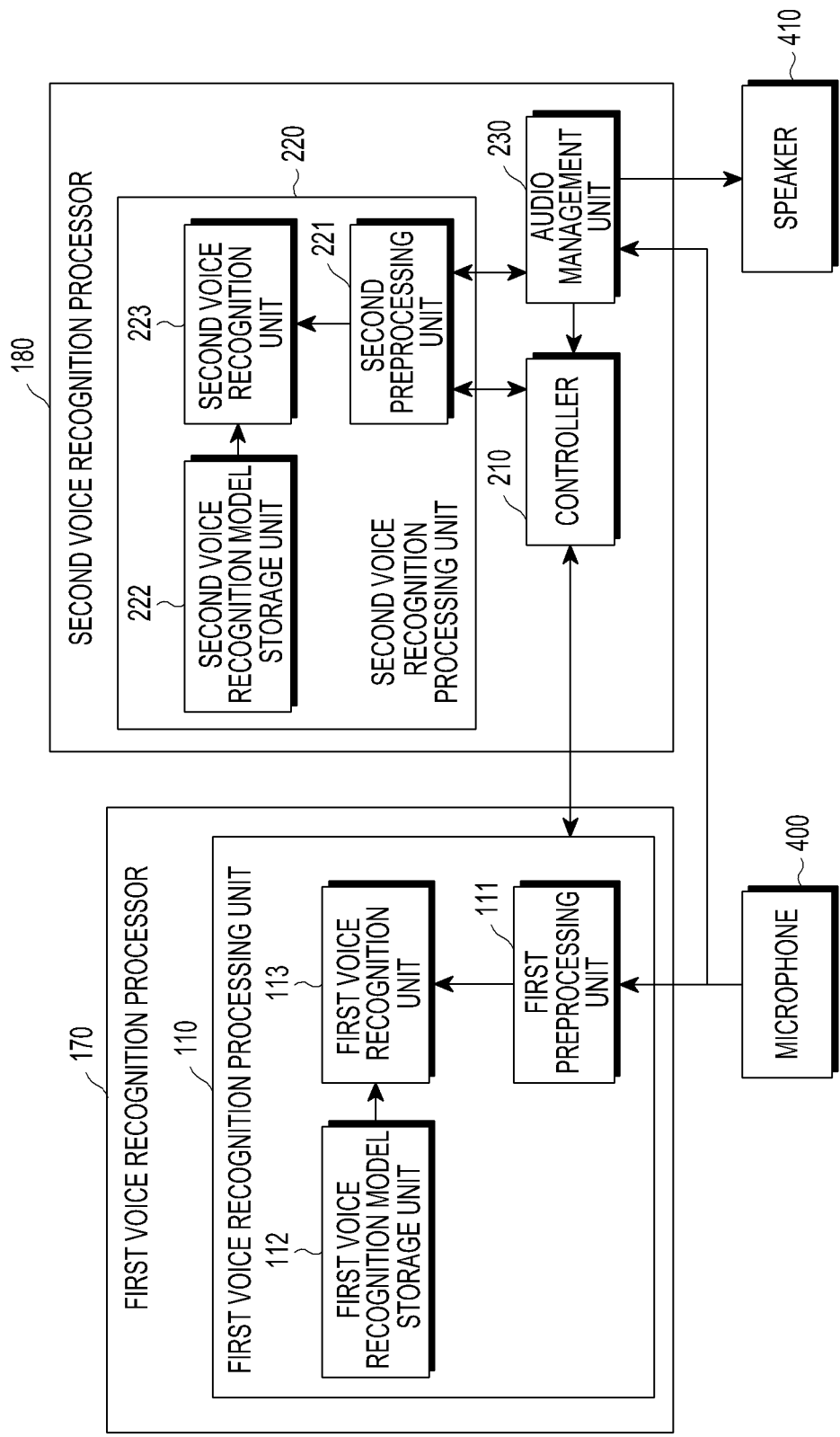
FIG. 3 illustrates an electronic device including a first voice recognition processor and a second voice recognition processor according to an embodiment of the present disclosure.

FIG. 3 illustrates an electronic device including a first voice recognition processor and a second voice recognition processor according to an embodiment of the present disclosure. Specifically, FIG. 3 illustrates an electronic device similar to the electronic device of FIG. 2, except that the audio module 420 is omitted therefrom and the functionality thereof is included within the first voice recognition processor 170 and the second voice recognition processor 180. The other elements of the electronic device FIG. 3 may operate as described in FIG. 2.

Referring to FIG. 3, the controller 210 may receive the voice signal input from the microphone 400 through the audio management unit 230. The audio management unit 230 may directly receive a voice signal from the microphone 400 and directly transfer a voice signal to the speaker 410, and thus, the voice may be output through the speaker 410.

The second voice recognition unit 223 may recognize a voice by using the first voice recognition model of the first voice recognition processor 170. Further, the first voice recognition unit 113 and/or the second voice recognition unit 223 may perform the voice recognition to recognize a particular speech of a particular speaker.

Figure 4:
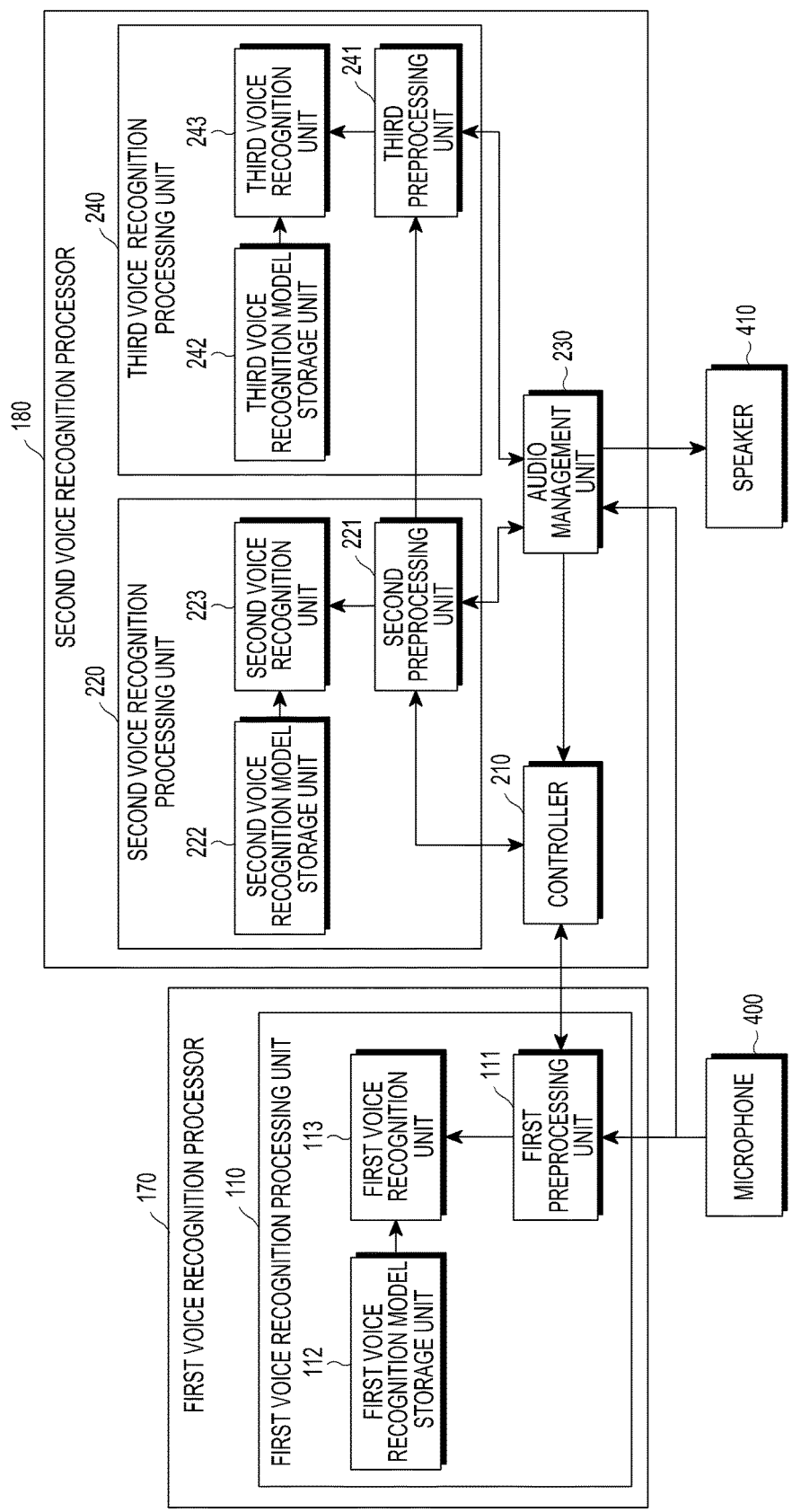
FIG. 4 illustrates an electronic device including a first voice recognition processor and a second voice recognition processor according to an embodiment of the present disclosure.

FIG. 4 illustrates an electronic device including a first voice recognition processor and a second voice recognition processor according to an embodiment of the present disclosure. Specifically, FIG. 4 illustrates an electronic device similar to the electronic device of FIG. 2, except that the second voice recognition processor 180 includes two voice recognition processing units.

Referring to FIG. 4, the second voice recognition processor 180 includes the second voice recognition processing unit 220 and a third voice recognition processing unit 240. The second voice recognition model of the second voice recognition processing unit 220 and a third voice recognition model of the third voice recognition processing unit 240 may include different voice recognition algorithms. The third voice recognition model may include a third level voice recognition algorithm for recognizing a command of a combination of a plurality of words. For example, the third level voice may be a phrase or/and a sentence of a combination of a plurality of words, such as "open camera". One of the second voice recognition model and the third voice recognition model may be the same recognition model as the first voice recognition model.

The third voice recognition processing unit 240 includes a third preprocessing unit 241, a third voice recognition model storage unit 242, and a third voice recognition unit 243.

Before the third voice recognition unit 243 performs voice recognition, the third preprocessing unit 241 may modify a voice signal input from the microphone 400 and output the modified voice signal to the third voice recognition unit 243. The third preprocessing unit 241 may be selectively implemented or may be omitted according to an implementation.

The third voice recognition model storage unit 242 stores a third voice recognition model used for the voice recognition by the third voice recognition unit 243. The third voice recognition model may include a third level voice recognition algorithm which can recognize a third level voice including a phrase or/and a sentence of a combination of a plurality of words. The third level voice recognition algorithm may recognize more commands than the second level voice recognition algorithm. For example, the third level voice recognition algorithm may be a natural language recognition algorithm, which recognizes a command including a combination of a plurality of words, such as "open camera".

The third voice recognition unit 243 may recognize the third level voice by using the third voice recognition model.

Figure 5:
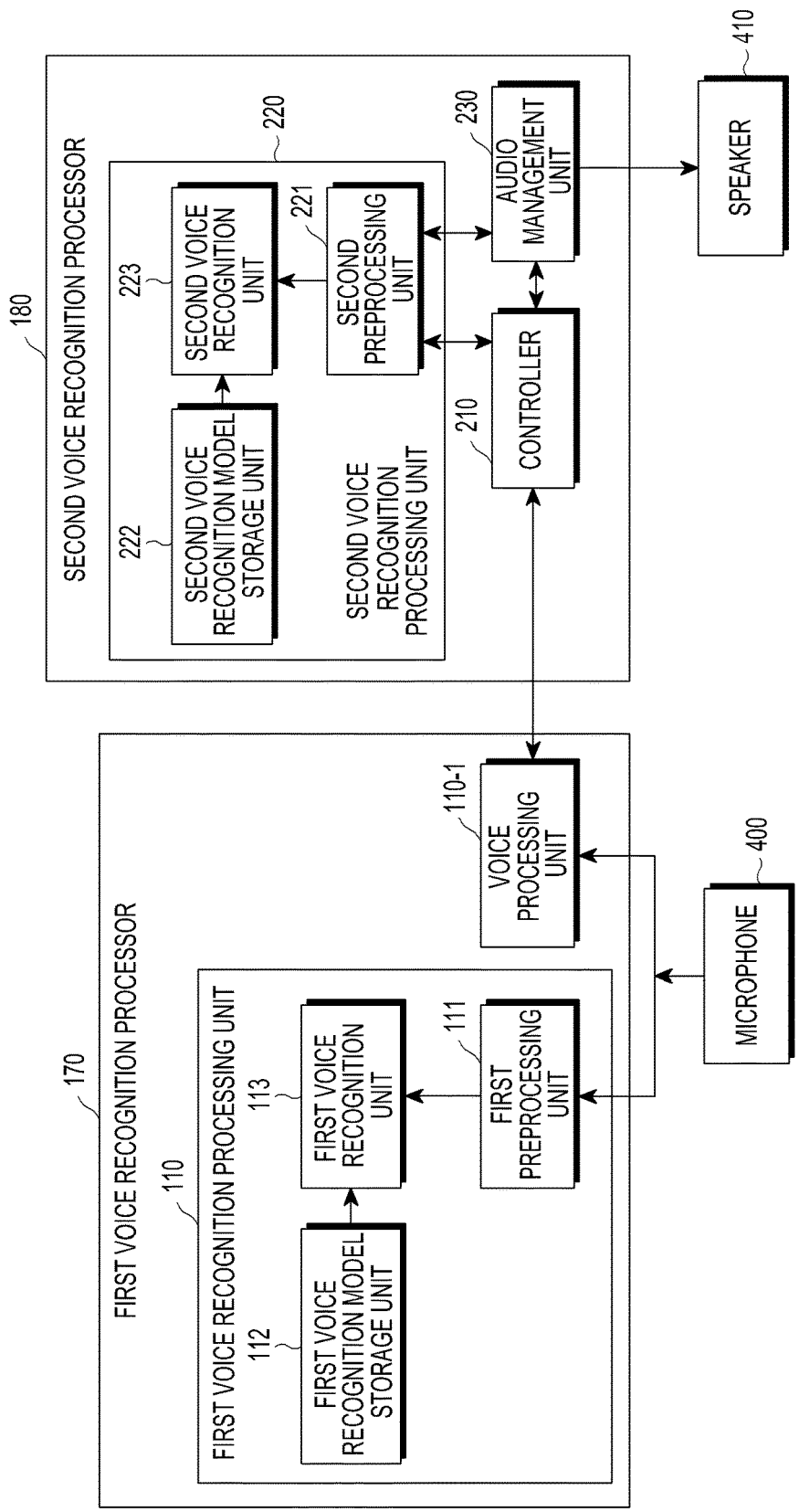
FIG. 5 illustrates an electronic device including a first voice recognition processor and a second voice recognition processor according to an embodiment of the present disclosure.

FIG. 5 illustrates an electronic device including a first voice recognition processor and a second voice recognition processor according to an embodiment of the present disclosure. Specifically, FIG. 5 illustrates an electronic device similar to the electronic device of FIG. 2, except that the first voice recognition processor 170 further includes a voice processing unit 110-1, and the voice signal input from the microphone 400 may be transferred to the voice processing unit 110-1. The first voice recognition processor 170 may operate as an audio module.

The voice processing unit 110-1 may convert a voice signal input from the microphone 400, i.e., convert an analog signal into a digital signal, and output the digital signal, or perform voice processing such as an Automatic Gain Control (AGC). The voice signal processed by the voice processing unit 110-1 may be transferred to the second voice recognition processing unit 220 through the audio management unit 230 of the second voice recognition processor 180 or used by an application or program.

The first voice recognition unit 113 may recognize a voice by using the first voice recognition model. The first voice recognition model may include a first level voice recognition algorithm, and may be a recognition model for recognizing a voice input or trained by the user.

When an application is executed, the second voice recognition unit 223 may recognize a voice by using the second voice recognition model specialized for the executed application. For example, the second voice recognition model may be a word recognition model, which can recognize several words, or a large vocabulary speech recognition model.

Figure 6:
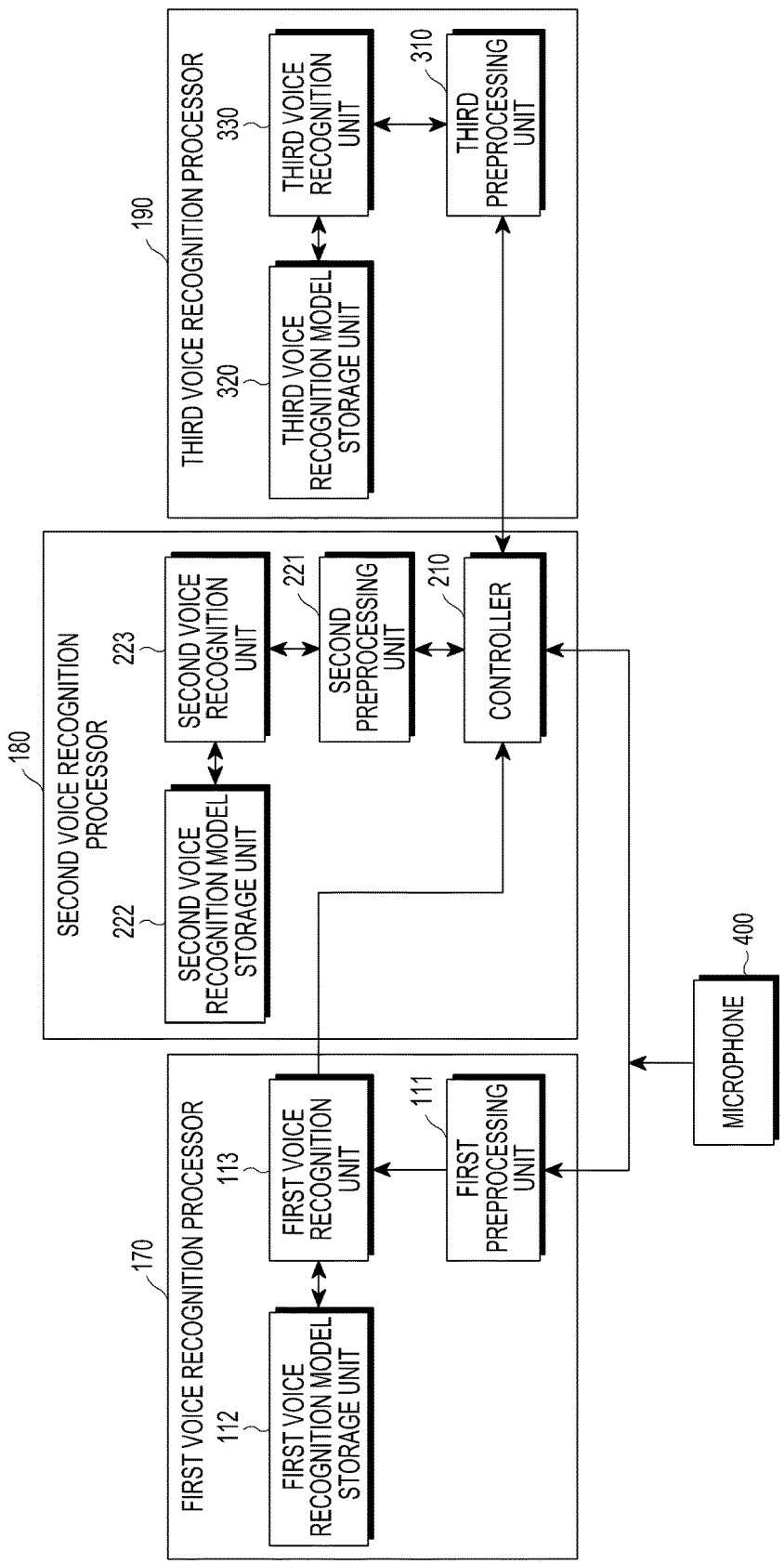
FIG. 6 illustrates a first voice recognition processor, a second voice recognition processor, and a third voice recognition processor according to an embodiment of the present disclosure.

FIG. 6 illustrates a first voice recognition processor, a second voice recognition processor, and a third voice recognition processor according to an embodiment of the present disclosure. Specifically, FIG. 6 illustrates an electronic device similar to the electronic device of FIG. 2, which includes the first voice recognition processor 170 and the second voice recognition processor 180, and an external electronic device including a third voice recognition processor 190.

The first voice recognition processor 170 includes the first preprocessing unit 111, the first voice recognition model storage unit 112, and the first voice recognition unit 113.

When the voice signal is received from the microphone 400, the first preprocessing unit 111 modifies the received first voice and transfers the modified first voice to the first voice recognition unit 113.

The first voice recognition model storage unit 112 may store the first voice recognition model including the first level voice recognition algorithm, which recognizes the first level voice.

The first voice recognition unit 113 may recognize the first voice by using the first voice recognition model and determine whether the recognized first voice includes a first command. When it is determined that the first voice includes the first command, the first voice recognition unit 113 may transfer an input second voice to the third voice recognition processor 190. Further, when it is determined that the first voice does not include the first command, the first voice recognition unit 113 may terminate the voice recognition.

The second voice recognition processor 180 includes the controller 210, the second preprocessing unit 221, the second voice recognition model storage unit 222, and the second voice recognition unit 223.

The controller 210 controls general operations of the first voice recognition processor 170 and/or the second voice recognition processor 180, such as a voice recognition control, a signal control between respective elements, etc. When the first voice is received, the controller 210 may transfer the first voice to the second preprocessing unit 221. When a result of the voice recognition is received by the second voice recognition unit 223, the controller 210 may perform an operation corresponding to a result of the voice recognition.

Although FIG. 6 illustrates the controller 210 being included in the second voice recognition processor 180, the present disclosure is not limited thereto and the controller 210 may be included in the first voice recognition processor 170 or may be configured separately from the first voice recognition processor 170 and the second voice recognition processor 180. Also, the first voice recognition processor 170 and/or the second voice recognition processor 180 may control each operation.

Before the second voice recognition unit 223 performs voice recognition, the second preprocessing unit 221 may modify a voice signal and output the modified voice signal to the second voice recognition unit 223. The second preprocessing unit 221 may be selectively implemented or may be omitted according to an implementation.

The second voice recognition model storage unit 222 may store the second voice recognition model including the second level voice recognition algorithm, which recognizes the second level voice. The second level voice may include the first level voice.

The second voice recognition unit 223 may recognize the first voice by using the second voice recognition model and determine whether the recognized first voice includes a first command. When it is determined that the first voice includes the first command, the second voice recognition unit 223 may recognize an input second voice and determine whether the recognized second voice includes a second command. When it is determined that the first voice does not include the first command, the second voice recognition unit 223 may terminate the voice recognition.

When it is determined that the second voice includes the second command, the second voice recognition unit 223 may transfer a result of the voice recognition to the controller 210, and the controller 210 may perform an operation corresponding to the second command. When it is determined that the second voice does not include the second command, the second voice recognition unit 223 may terminate the voice recognition.

The third voice recognition processing unit 190 includes a third preprocessing unit 310, a third voice recognition model storage unit 320, and a third voice recognition unit 330.

Before the third voice recognition unit 330 performs voice recognition, the third preprocessing unit 310 may modify a voice signal and output the modified voice signal to the third voice recognition unit 330. The third preprocessing unit 310 may be selectively implemented or may be omitted according to an implementation.

The third voice recognition model storage unit 320 may store a third voice recognition model including the third level voice recognition algorithm that recognizes the third level voice.

The third voice recognition unit 330 may recognize the second voice by using the third voice recognition model and determine whether the recognized second voice includes a second command or/and a third command.

When it is determined that the second voice includes the second command or/and the third command, the third voice recognition unit 330 may transfer a result of the voice recognition to the second voice recognition processor 180.

When it is determined that the second voice does not include the second command or/and the third command, the third voice recognition unit 330 may terminate the voice recognition.

Thereafter, the second voice recognition processor 180 may perform an operation corresponding to the second command or/and the third command.

The electronic device may also include at least one of a first voice recognition device and a second voice recognition device, which acquires a first voice. When an additionally recognized second voice is recognized through an external electronic device, a first voice acquired by the first voice recognition device includes a predetermined command, and an additionally recognized second voice is recognized, then a related operation is performed based on the recognized second voice.

Figure 7:
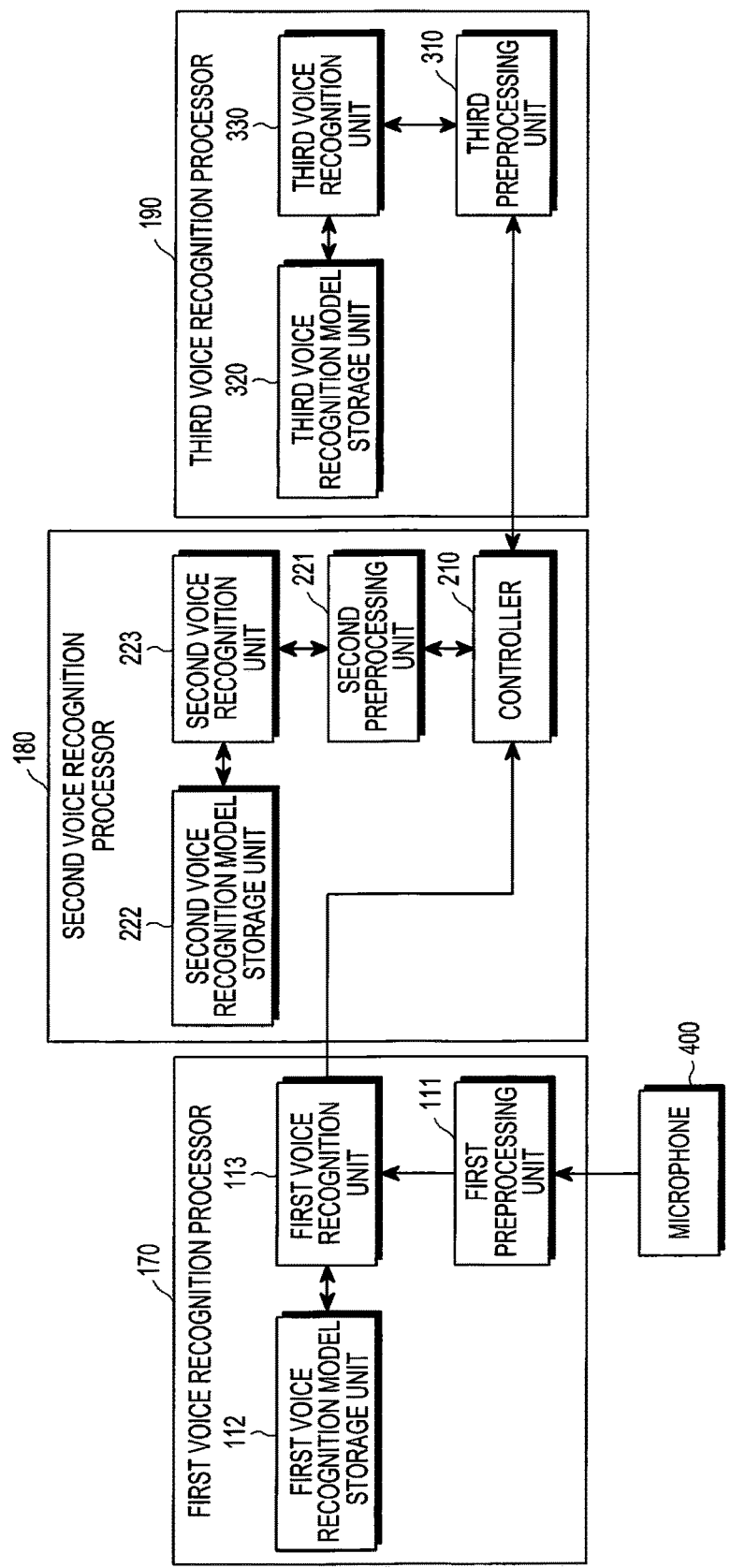
FIG. 7 illustrates a first voice recognition processor, a second voice recognition processor, and a third voice recognition processor according to an embodiment of the present disclosure.

FIG. 7 illustrates a first voice recognition processor, a second voice recognition processor, and a third voice recognition processor according to an embodiment of the present disclosure. Specifically, FIG. 7 illustrates an electronic device and an external electronic device similar to FIG. 6, except that the microphone is only directly connected to the first preprocessing unit 111.

Referring to FIG. 7, when a voice signal is received from the microphone 400, the first preprocessing unit 111 modifies the received first voice and transfers the modified first voice to the first voice recognition unit 113.

The first voice recognition model storage unit 112 may store the first voice recognition model including the first level voice recognition algorithm that recognizes the first level voice.

The first voice recognition unit 113 may recognize the first voice by using the first voice recognition model and determine whether the recognized first voice includes a first command. When it is determined that the first voice includes the first command, the first voice recognition unit 113 may transfer an input second voice to the third voice recognition processor 190, e.g., through the controller 210. However, when it is determined that the first voice does not include the first command, the first voice recognition unit 113 may transfer the first voice to the second voice recognition processor 180.

When the first voice is received from the first voice recognition unit 113, the controller 210 may transfer the first voice to the second preprocessing unit 221. When a result of the voice recognition is received by the second voice recognition unit 223, the controller 210 may perform an operation corresponding to a result of the voice recognition.

Before the second voice recognition unit 223 performs the voice recognition, the second preprocessing unit 221 may modify a voice signal and output the modified voice signal to the second voice recognition unit 223. The second preprocessing unit 221 may be selectively implemented or may be omitted according to an implementation.

The second voice recognition model storage unit 222 may store the second voice recognition model including the second level voice recognition algorithm that recognizes the second level voice.

The second voice recognition unit 223 may recognize the first voice by using the second voice recognition model and determine whether the recognized first voice includes a first command.

When it is determined that the first voice includes the first command, the second voice recognition unit 223 may recognize an input second voice and determine whether the recognized second voice includes a second command. When it is determined that the first voice does not include the first command, the second voice recognition unit 223 may terminate the voice recognition.

Further, when it is determined that the second voice includes the second command, the second voice recognition unit 223 may transfer a result of the voice recognition to the controller 210, and the controller 210 may perform an operation corresponding to the second command.

When it is determined that the second voice does not include the second command, the second voice recognition unit 223 may terminate the voice recognition.

Further, when it is determined that the first voice does not include the first command, the second voice recognition unit 223 may determine whether the first voice includes the second command. When it is determined that the first voice includes the second command, the second voice recognition unit 223 may transfer a result of the voice recognition to the controller 210.

Before the third voice recognition unit 330 performs the voice recognition, the third preprocessing unit 310 may modify a voice signal and output the modified voice signal to the third voice recognition unit 330. The third preprocessing unit 310 may be selectively implemented or may be omitted according to an implementation.

The third voice recognition model storage unit 320 may store the third voice recognition model including the third level voice recognition algorithm that recognizes the third level voice.

The third voice recognition unit 330 may recognize the second voice by using the third voice recognition model and determine whether the recognized second voice includes a second command or/and a third command.

When it is determined that the second voice includes the second command and/or the third command, the third voice recognition unit 330 may transfer a result of the voice recognition to the second voice recognition processor 180. However, when it is determined that the second voice does not include the second command and/or the third command, the third voice recognition unit 330 may terminate the voice recognition.

In accordance with another aspect of the present disclosure, an electronic device is provided, which includes a first voice recognition device; and a second voice recognition device. When a first voice is received by the first voice recognition device and the first voice recognition device recognizes a predetermined command in the first voice, the first voice recognition device transfers a received second voice to an external electronic device and recognizing the received second voice through the external electronic device. When the first voice is received by the second voice recognition device and the second voice recognition device recognizes the predetermined command in the first voice, the second voice recognition device recognizes a second command in the received second voice, and performs an operation based on the recognized second command In accordance with another aspect of the present disclosure, an electronic device is provided, which includes a first voice recognition device; a second voice recognition device; and a processor for executing a predetermined application and determining whether voice recognition of a first voice can be performed by the first voice recognition device or the second voice recognition device. When the voice recognition of the first voice can be performed by the first voice recognition device and the first voice recognition device recognizes a predetermined command in the first voice, the first voice recognition device transfers a received second voice to an external electronic device and recognizes the received second voice through the external electronic device. When the voice recognition of the first voice cannot be performed by the first voice recognition device, the second voice recognition device performs the voice recognition, and when the second voice recognition device recognizes the predetermined command in the first voice, the second voice recognition device recognizes a second command in the received second voice and performs an operation based on the recognized second command.

Figure 8:
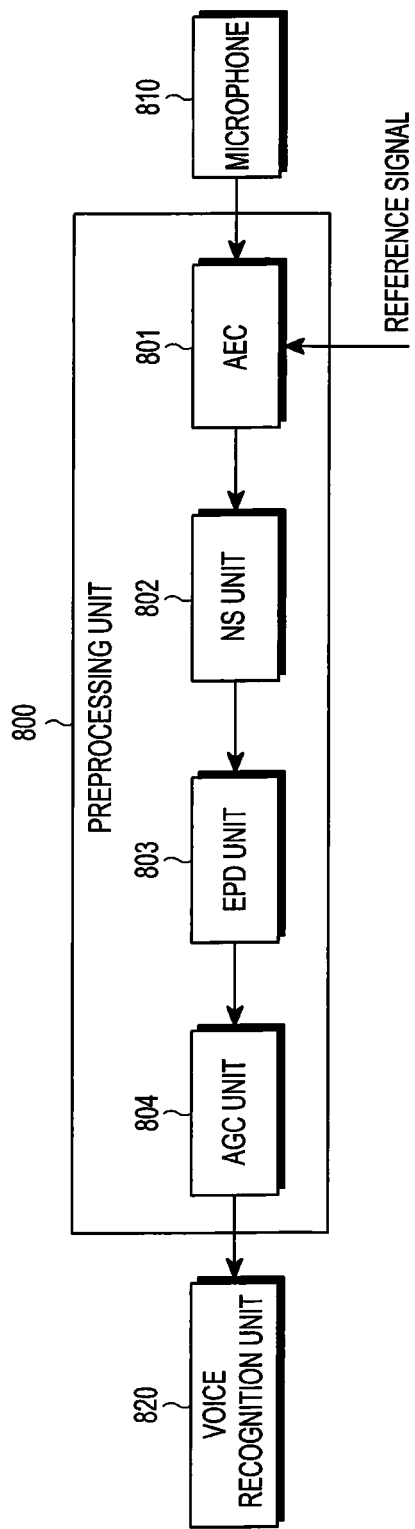
FIG. 8 illustrates a preprocessing unit according to an embodiment of the present disclosure.

FIG. 8 illustrates a preprocessing unit according to an embodiment of the present disclosure.

Referring to FIG. 8, a preprocessing unit 800 includes an Adaptive Echo Canceller (AEC) 801, a Noise Suppression (NS) unit 802, an End-Point Detection (EPD) unit 803, and an AGC unit 804.

The AEC 801 removes an echo from a voice signal input from a microphone 810 based on a reference signal. For example, if a voice signal is input when an application of outputting a sound, such as a phone call, a ringtone, a music player, a camera, etc., is executed by the second voice recognition processor 180, the AEC 801 may remove an echo, which is input by the execution of the application, from the input voice signal and transfer the voice signal to a voice recognition unit 820.

The NS unit 802 suppresses noise from the input voice signal.

The EPD unit 803 detects an end point of the voice to identify where the voice actually exists in the input voice signal.

The AGC unit 804 automatically controls voice signal amplitude, even though a propagation intensity of the input voice signal varies.

The elements of the preprocessing unit 800 may be omitted from the first preprocessing unit 111 in order to ensure operation with low power, and the elements of the preprocessing unit 800 may be included in the second preprocessing unit 221 in order to increase the performance of the voice recognition therein.

As described above, the first voice recognition processor 170 may be implemented as a low power processor. Even when the second voice recognition processor 180 is in an idle mode, the first voice recognition processor 170 may wait for an input of the voice signal. Here, the idle mode refers to a state where power is not supplied, e.g., when a screen of the electronic device is turned off and only necessary elements operate through the supply of minimum power.

When the voice is input from the microphone 400, the first voice recognition unit 113 of the first voice recognition processor 170 recognizes the input voice. When the input voice includes a command to activate the second voice recognition processor 180, the first voice recognition unit 113 transfers a signal for activating the second voice recognition processor 180 to the controller 210. Thereafter, the controller 210 may perform the voice recognition by activating the second voice recognition processing unit 220.

Even when the second voice recognition processor 180 is in an active state, the controller 210 may perform the voice recognition through the first voice recognition processor 170. At this time, the controller 210 may control the operation of the first voice recognition processor 170 by using application information and information received from the audio management unit 230 or may control the operation of the first voice recognition processing unit 110 and the second voice recognition processing unit 220.

When the voice is received, the electronic device may perform the voice recognition by the first voice recognition processor 170, stop the voice recognition of the first voice recognition processor 170 based on the operation of the audio processing unit, which processes the audio signal, such as the audio module, the speaker, the audio management unit, etc., and perform the voice recognition by the second voice recognition processor 180.

Based on whether an audio signal is output from the speaker, voice recognition may be performed by a processor selected from the low power processor and the high performance processor.

For example, when an application or a program that outputs sound is executed, if a voice signal for voice recognition is input, a sound output from the speaker becomes an echo in the microphone. Consequently, an input voice signal may be distorted, so the voice recognition should be performed through the high performance processor.

Figure 9:
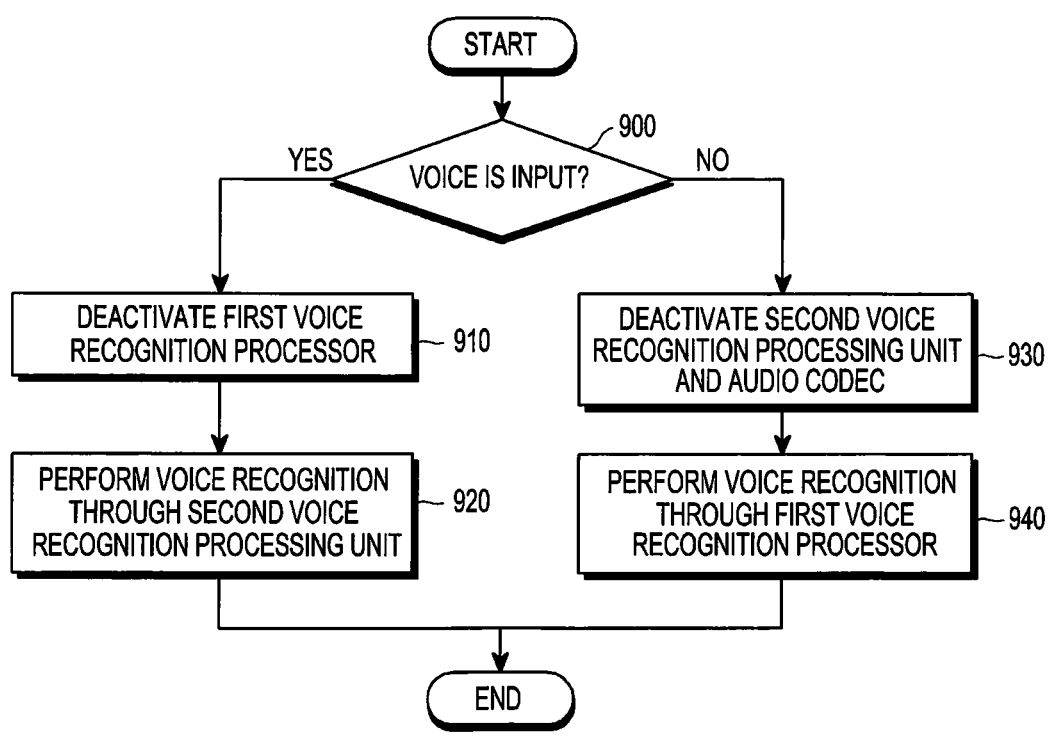
FIG. 9 is a flowchart illustrating a process of performing voice recognition through a first voice recognition processor or a second voice recognition processor according to an embodiment of the present disclosure.

FIG. 9 is a flowchart illustrating a process of performing voice recognition through a first voice recognition processor or a second voice recognition processor according to an embodiment of the present disclosure.

Referring to FIG. 9, when a voice is input in step 900, the controller 210 deactivates the first voice recognition processor 170 in step 910. For example, the controller 210 stops the supply of power to the first voice recognition processing unit 110 and stops the voice recognition of the first voice recognition processing unit 110 within the first voice recognition processor 170. The controller 210 may control the audio management unit 230 to determine whether the voice is output from the speaker 410.

In step 920, the controller 210 performs voice recognition through the second voice recognition processing unit 220 of the second voice recognition processor 180.

However, when the voice is not input in step 900, in step 930, the controller 210 deactivates states of the second voice recognition processing unit 220 of the second voice recognition processor 180 and the audio module 420. For example, the controller 210 stops the supply of power to the second voice recognition processing unit 220 and the audio module 420 in order to switch them to an idle state. That is, the controller 210 may stop a voice recognition operation in the second voice recognition processing unit 220 and the audio module 420.

In step 940, the controller 210 performs voice recognition through the first voice recognition processor 170.

Figure 10:
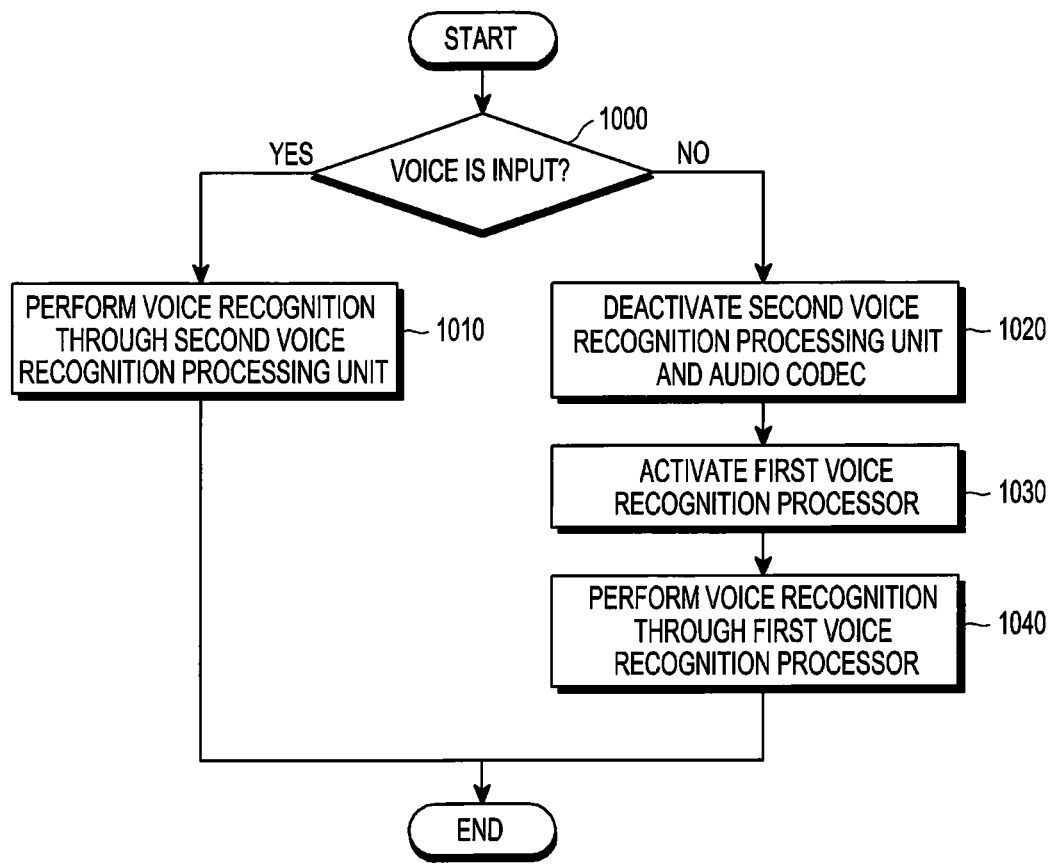
FIG. 10 is a flowchart illustrating a process of performing voice recognition through a first voice recognition processor or a second voice recognition processor according to an embodiment of the present disclosure.

FIG. 10 is a flowchart illustrating a process of performing voice recognition through a first voice recognition processor or a second voice recognition processor according to an embodiment of the present disclosure.

Referring to FIG. 10, the controller 210 determines whether a voice is input in step 1000. When the voice is input in step 1000, the controller 210 performs the voice recognition through the second voice recognition processing unit 220 in step 1010.

When the voice is not input in step 1000, the controller 210 deactivates the second voice recognition processing unit 220 in step 1020, and activates the first voice recognition processor 170 in step 1030. For example, the controller switches a state of the first voice recognition processor 170 to a state where the voice recognition operation can be performed, by supplying power to the first voice recognition processor 170 in the idle state. In other words, the activation refers to a state where the first voice recognition processing unit 110 of the first voice recognition processor 170 can perform the voice recognition operation.

In step 1040, the controller 210 performs voice recognition through the first voice recognition processor 170.

Figure 11:
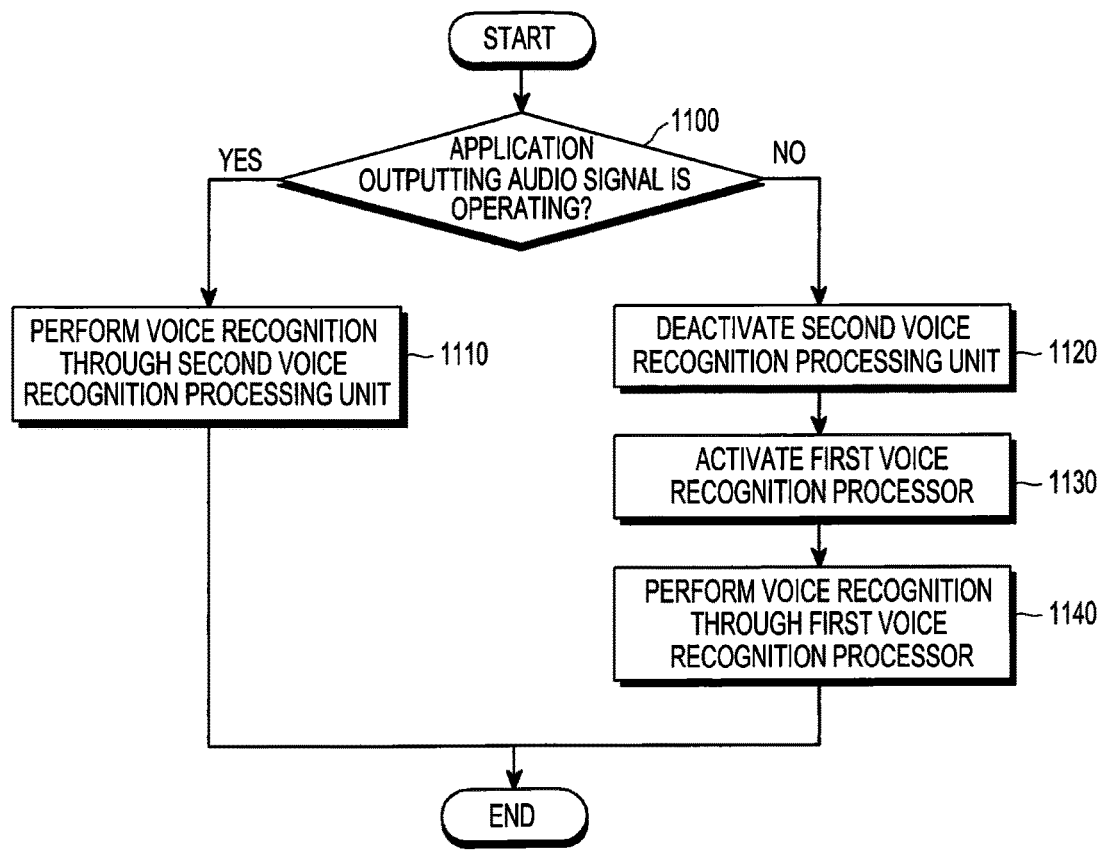
FIG. 11 is a flowchart illustrating a process of performing voice recognition through a first voice recognition processor or a second voice recognition processor according to an embodiment of the present disclosure.

FIG. 11 is a flowchart illustrating a process of performing voice recognition through a first voice recognition processor or a second voice recognition processor according to an embodiment of the present disclosure.

Referring to FIG. 11, in step 1100, the controller 210 determines whether an application that outputs an audio signal is being executed.

When the application that outputs the audio signal is being executed in step 1100, the controller 210 performs voice recognition through the second voice recognition processor 220 in step 1110.

When the application that outputs the audio signal is not being executed in step 1100, the controller 210 deactivates the second voice recognition processing unit 220 in step 1120, and activates the first voice recognition processor 170 in step 1130.

In step 1140, the controller 210 performs voice recognition through the activated first voice recognition processor 170.

Figure 12:
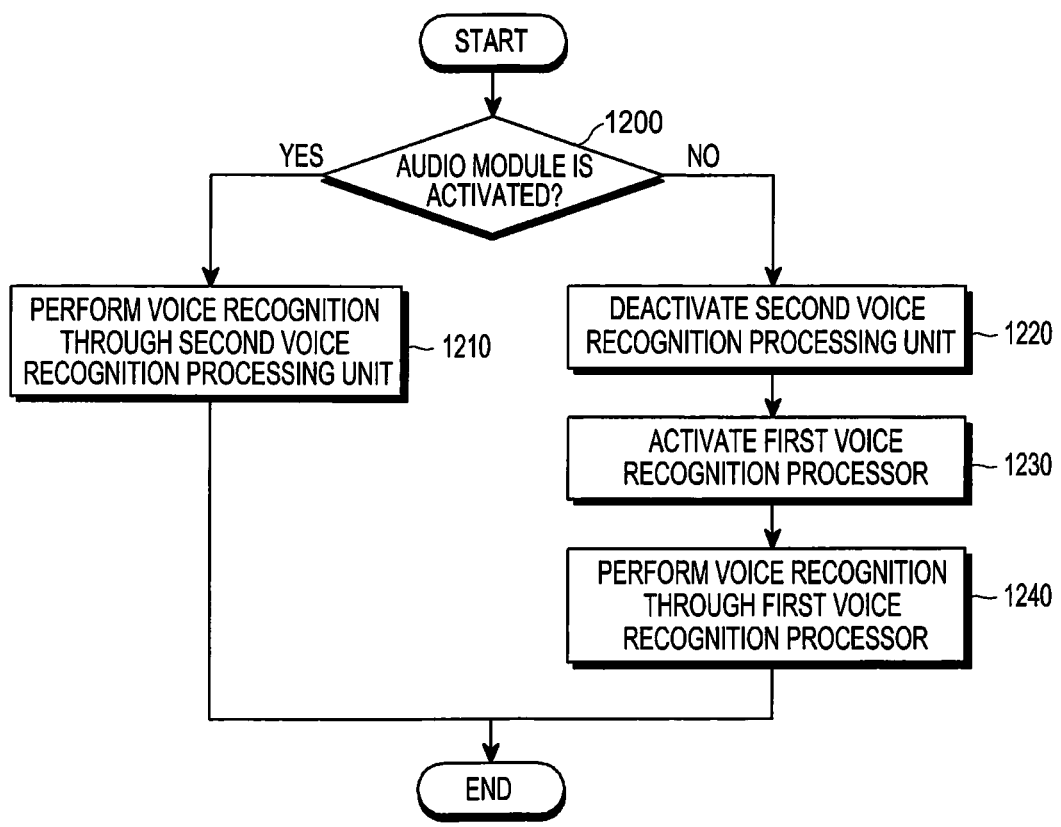
FIG. 12 is a flowchart illustrating a process of performing voice recognition through a first voice recognition processor or a second voice recognition processor according to an embodiment of the present disclosure.

FIG. 12 is a flowchart illustrating a process of performing voice recognition through a first voice recognition processor or a second voice recognition processor according to an embodiment of the present disclosure.

Referring to FIG. 12, the controller 210 determines whether the audio module 420 is activated in step 1200.

When the audio module 420 is activated in step 1200, the controller 210 performs voice recognition through the second voice recognition processor 220 in step 1210.

When the audio module 420 is not activated in step 1200, the controller 210 deactivates the second voice recognition processing unit 220 in step 1220, and activates the first voice recognition processor 170 in step 1230.

In step 1240, the controller 210 performs voice recognition through the first voice recognition processor 170.

For example, when a voice input of "Hi Galaxy" is predetermined as a wake-up command for the activation, the controller 210 may activate a particular voice recognition processor if the voice input of "Hi Galaxy" is received from the microphone 400. Thereafter, the controller 210 may perform additional voice recognition by using the activated voice recognition processor, or stop/start the operation of the particular voice recognition processor. The voice may be recognized by the first voice recognition unit 110 of the first voice recognition processor 170 or the second voice recognition unit 220 of the second voice recognition processor 180.

Further, when an application or a program, which reproduces music, is executed, if an audio signal output from the speaker 410 becomes an echo and flows into the microphone, a voice input signal input into the microphone 400 may be distorted. Basically, the controller 210, which performs the voice recognition through the first voice recognition processor 170, may determine whether the audio signal is output through the speaker 410 and, when the audio signal is output through the speaker 410, deactivate the first voice recognition processor 170 and activate the second voice recognition processor 220. That is, the controller 210 may determine whether the audio signal is output through the speaker 410 in order to determine whether the music reproduction application operates or the audio module 420 is activated.

Thereafter, the second preprocessing unit 221 performs signal processing, such as an AEC or the like, for suppressing distortion of the input voice and transfer the refined voice to the second voice recognition unit 223.

Figure 13:
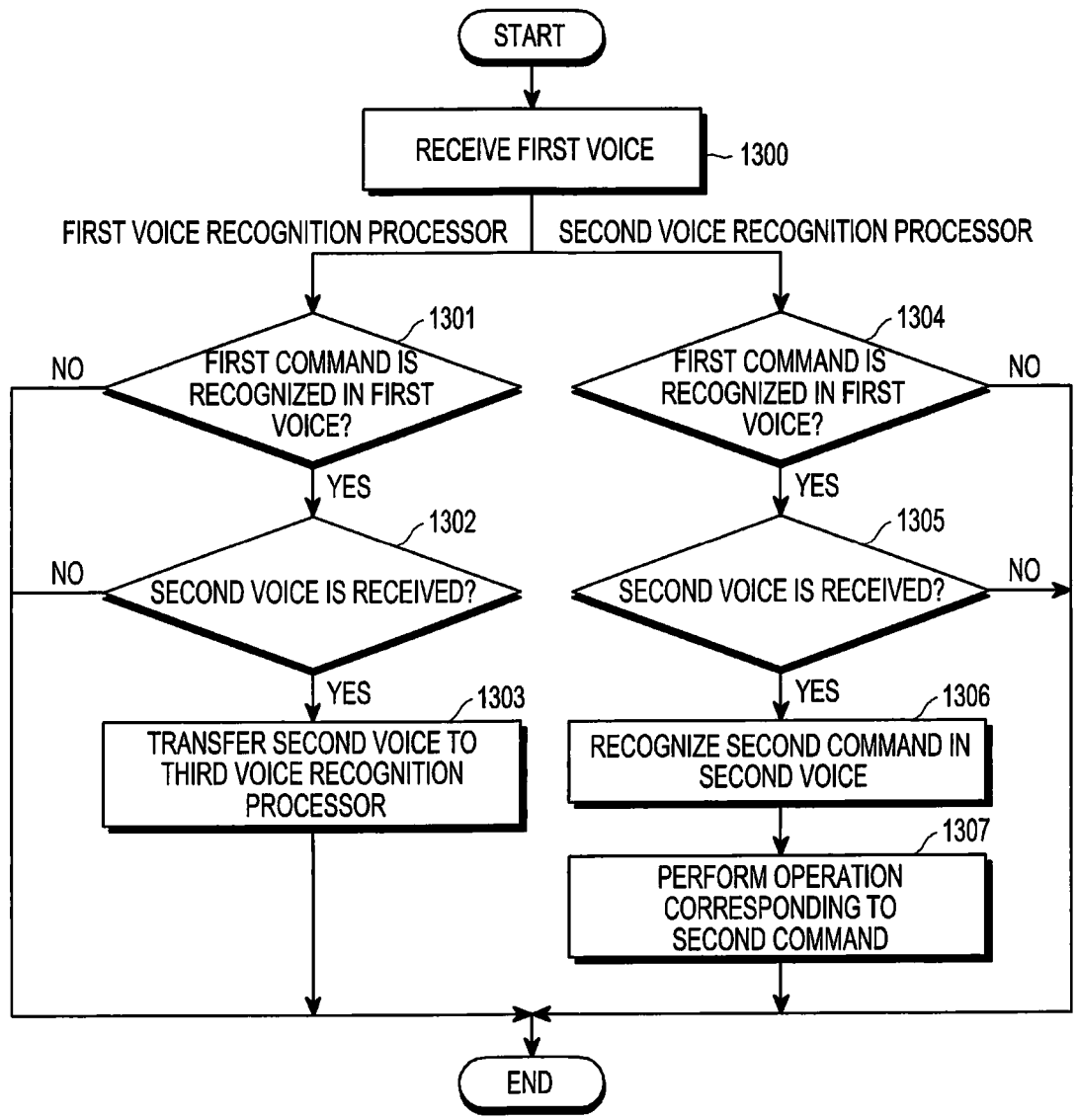
FIG. 13 is a flowchart illustrating a process of performing voice recognition through a first voice recognition processor, a second voice recognition processor, and a third voice recognition processor according to an embodiment of the present disclosure.

FIG. 13 is a flowchart illustrating a process of performing voice recognition through a first voice recognition processor, a second voice recognition processor, and a third voice recognition processor according to an embodiment of the present disclosure.

Referring to FIG. 13, in step 1300, the first voice recognition processor 170 and the second voice recognition processor 180 receive a first voice from the microphone 400.

In step 1301, the first voice recognition processor 170 recognizes the first voice and determines whether the first voice includes a first command. When the first voice includes the first command in step 1301, the first voice recognition processor 170 determines whether a second voice is received in step 1302.

When the second voice is received in step 1302, the first voice recognition processor 170 transfers the received second voice to the third voice recognition processor 190 in step 1303.

When the first voice does not include the first command in step 1301 or when the second voice is not received in step 1302, the first voice recognition processor 170 terminates the voice recognition.

Accordingly, after receiving and recognizing the second voice, the third voice recognition processor 190 may transfer a result of the recognition to the first voice recognition processor 170 or the second voice recognition processor 180, and the first voice recognition processor 170 or the second voice recognition processor 180 may perform an operation corresponding to the recognition result.

In step 1304, the second voice recognition processor 180 recognizes the first voice and determines whether the first voice includes the first command.

When the first voice includes the first command in step 1304, the second voice recognition processor 180 determines whether a second voice is received in step 1305.

When the second voice is received in step 1305, the second voice recognition processor 180 recognizes the received second voice in step 1306.

In step 1307, the second voice recognition processor 180 performs an operation corresponding to the second command.

When the first voice does not include the first command in step 1304 or when the second voice is not received in step 1305, the second voice recognition processor 180 terminates the voice recognition.

In accordance with an aspect of the present disclosure, a method is provided for performing voice recognition by an electronic device including a first voice recognition device and a second voice recognition device. The method includes receiving a first voice by one of the first voice recognition device and the second voice recognition device; when the first voice is received by the first voice recognition device and the first voice recognition device recognizes a predetermined command in the first voice, transferring a received second voice to an external electronic device and recognizing the received second voice through the external electronic device; and when the first voice is received by the second voice recognition device and the second voice recognition device recognizes the predetermined command in the first voice, recognizing a second command in the received second voice, and performing an operation based on the recognized second command.

Figure 14:
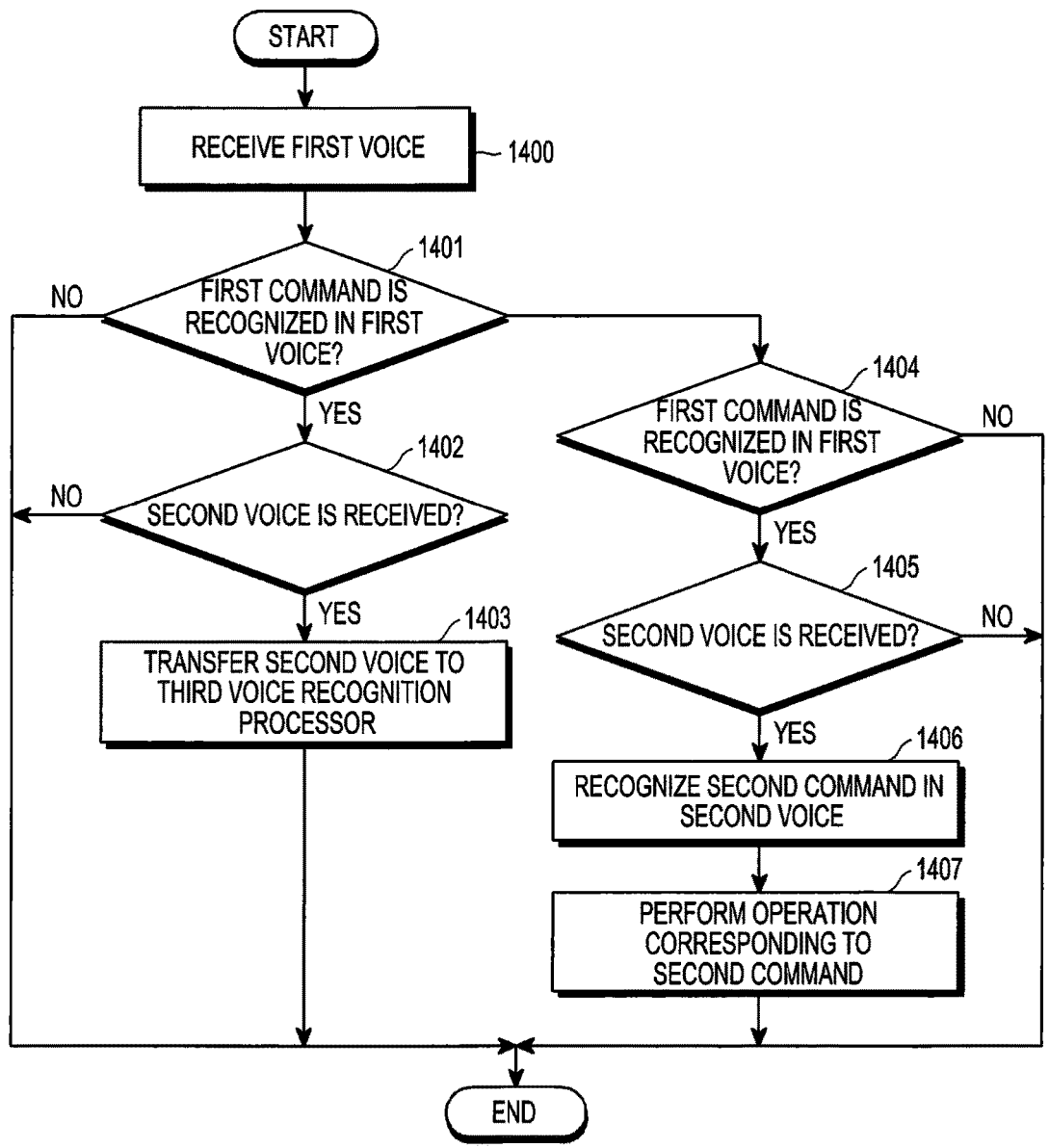
FIG. 14 is a flowchart illustrating a process of performing voice recognition through a first voice recognition processor, a second voice recognition processor, and a third voice recognition processor according to an embodiment of the present disclosure.

FIG. 14 is a flowchart illustrating a process of performing voice recognition through a first voice recognition processor, a second voice recognition processor, and a third voice recognition processor according to an embodiment of the present disclosure.

Referring to FIG. 14, in step 1400, the first voice recognition processor 170 may receive a first voice from the microphone 400.

In step 1401, the first voice recognition processor 170 recognizes the first voice and determines whether the first voice includes a first command.

When the first voice includes the first command in step 1401, the first voice recognition processor 170 determines whether a second voice is received in step 1402.

When the second voice is received in step 1402, the first voice recognition processor 170 transfers the received second voice to the third voice recognition processor 190 in step 1403.

After receiving and recognizing the second voice, the third voice recognition processor 190 may transfer a result of the recognition to the first voice recognition processor 170 or the second voice recognition processor 180, and the first voice recognition processor 170 or the second voice recognition processor 180 may perform an operation corresponding to the recognition result.

When the first voice does not include the first command in step 1401 or when the second voice is not received in step 1402, the first voice recognition processor 170 terminates the voice recognition.

When the first voice does not include the first command in step 1401, the first voice recognition processor 170 also transfers the received first voice to the second voice recognition processor 180.

In step 1404, the second voice recognition processor 180 recognizes the first voice and determines whether the first voice includes the first command.

When the first voice includes the first command in step 1404, the second voice recognition processor 180 determines whether a second voice is received in step 1405.

When the second voice is received in step 1405, the second voice recognition processor 180 recognizes the received second voice in step 1406.

In step 1407, the second voice recognition processor 180 performs an operation corresponding to the second command.

When the first voice does not include the first command in step 1404 or when the second voice is not received in step 1405, the second voice recognition processor 180 terminates the voice recognition.

Figure 15:
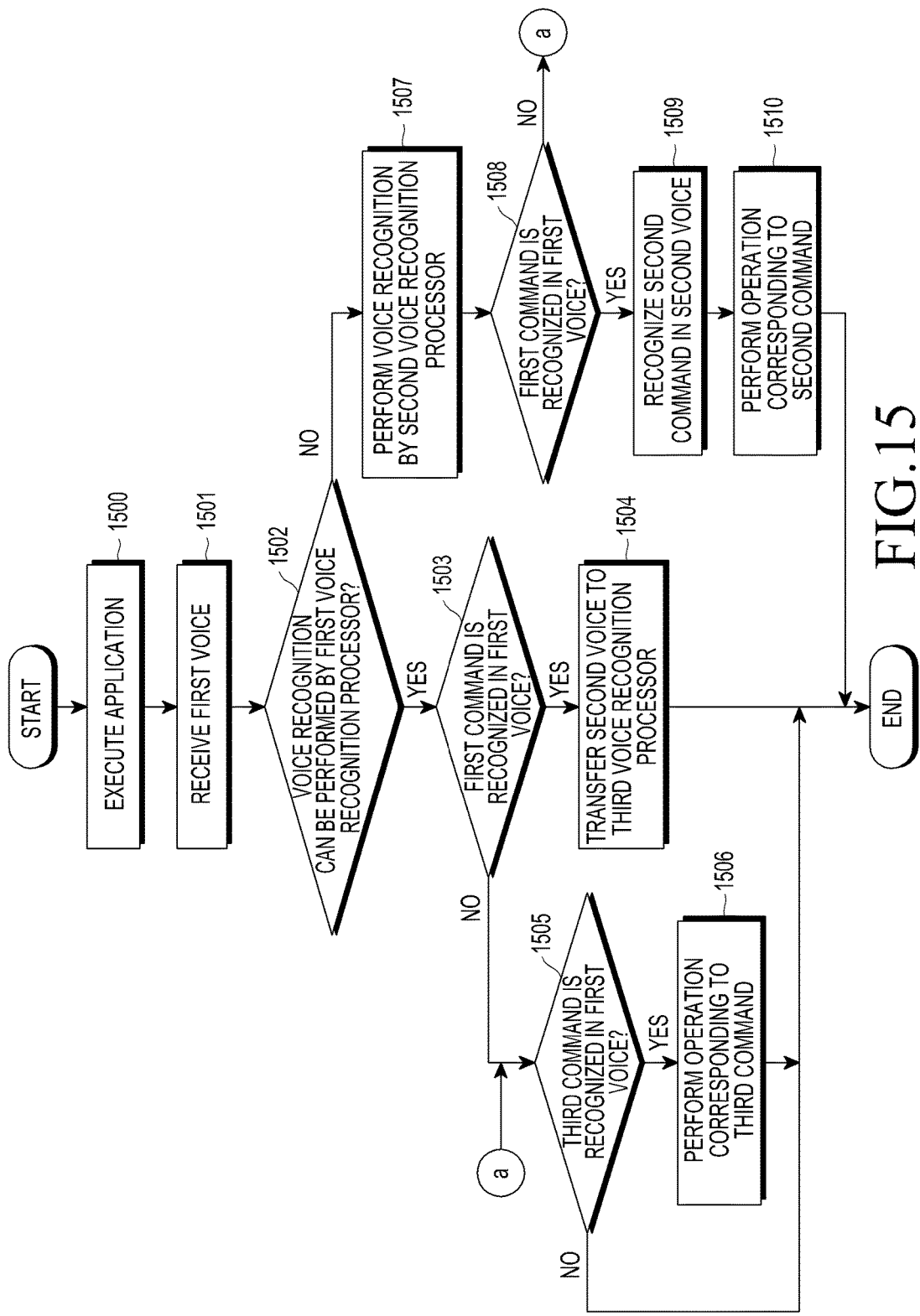
FIG. 15 is a flowchart illustrating a process of performing voice recognition through a first voice recognition processor, a second voice recognition processor, and a third voice recognition processor according to an embodiment of the present disclosure.

FIG. 15 is a flowchart illustrating a process of performing voice recognition through a first voice recognition processor, a second voice recognition processor, and a third voice recognition processor according to an embodiment of the present disclosure.

Referring to FIG. 15, in step 1500, the first voice recognition processor 170 executes an application.

In step 1501, the first voice recognition processor 170 receives a first voice from the microphone 400.

In step 1502, the first voice recognition processor 170 determines whether the voice recognition can be performed on the executed application.

When the voice recognition can be performed in step 1502, the first voice recognition processor 170 recognizes the first voice and determines whether the first voice includes a first command in step 1503.

When the first voice includes the first command in step 1503, the first voice recognition processor 170 transfers a received second voice to the third voice recognition processor 190 in step 1504.

When the first voice does not include the first command in step 1503, the first voice recognition processor 170 recognizes the first voice and determines whether the first voice includes a third command in step 1505.

When the first voice includes the third command in step 1505, the first voice recognition processor 170 performs an operation corresponding to the third command.

However, when the first voice does not include the third command in step 1505, the first voice recognition processor 170 terminates the voice recognition.

When the voice recognition cannot be performed in step 1502, the second voice recognition processor 180 performs the voice recognition on the executed application in step 1507.

In step 1508, the second voice recognition processor 180 recognizes the first voice and determines whether the first voice includes the first command.

When the first voice does not include the first command in step 1508, the first voice recognition processor 170 performs steps 1505 and 1506.

When the first voice does not include the first command in step 1508, the second voice recognition processor 180 recognizes a second command included in a second voice in step 1509.

In step 1510, the second voice recognition processor 180 performs an operation corresponding to the second command.

In accordance with another aspect of the present disclosure, a method is provided for performing voice recognition by an electronic device including a first voice recognition device and a second voice recognition device. The method includes executing a predetermined application; receiving a first voice for the application; determining whether voice recognition of the first voice can be performed by the first voice recognition device; when the voice recognition of the first voice can be performed by the first voice recognition device and the first voice recognition device recognizes a predetermined command in the first voice, transferring a received second voice to an external electronic device and recognizing the received second voice through the external electronic device; and when the voice recognition of the first voice cannot be performed by the first voice recognition device, performing the voice recognition by the second voice recognition device, and when the second voice recognition device recognizes the predetermined command in the first voice, recognizing a second command in the received second voice, and performing an operation based on the recognized second command.

Figure 16:
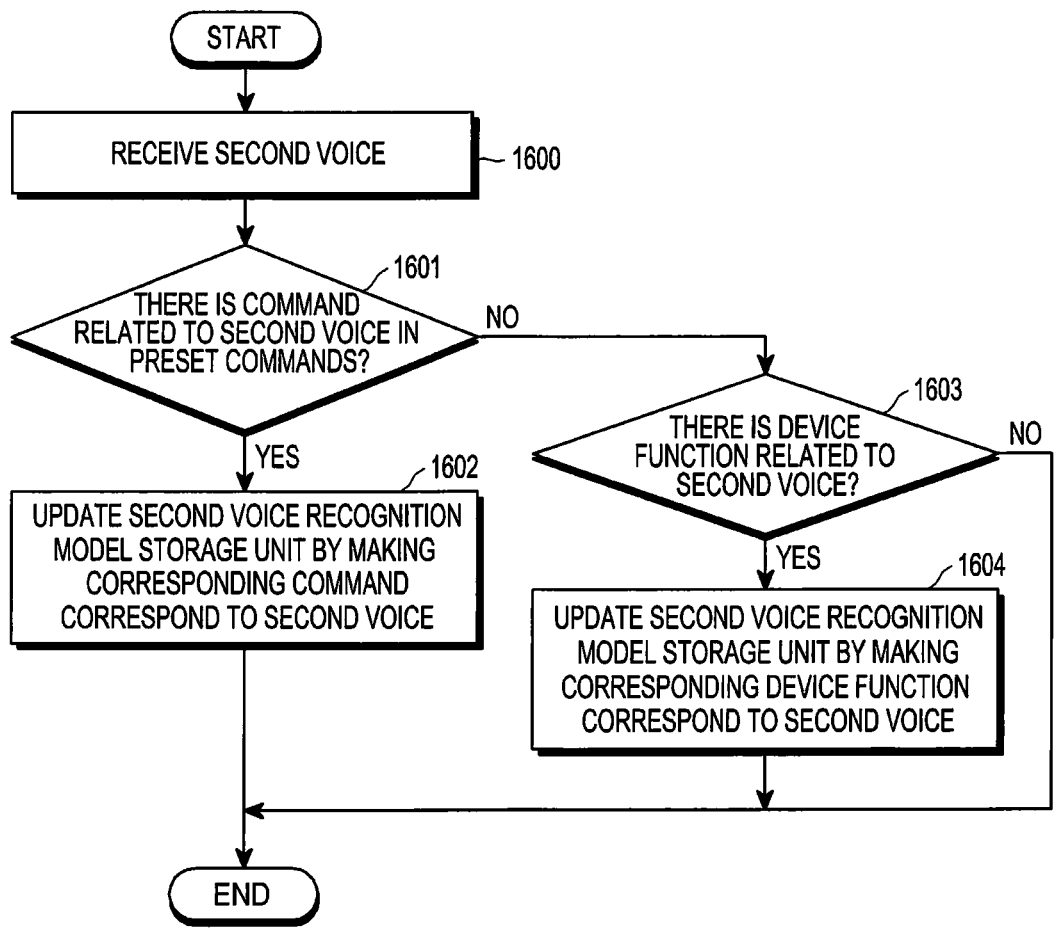
FIG. 16 is a flowchart illustrating a process of upgrading a voice recognition model through a third voice recognition processor according to an embodiment of the present disclosure.

FIG. 16 is a flowchart illustrating a process of upgrading a voice recognition model through a third voice recognition processor according to an embodiment of the present disclosure.

Referring to FIG. 16, in step 1600, the third voice recognition processor 190 recognizes a second voice.

In step 1601, the third voice recognition processor 190 determines whether a command related to the second voice is included in preset commands. For example, when the recognized second voice is "Begin", the third voice recognition processor 190 may determine whether there is a command related to "Begin" and/or a command similar to "Begin".

When there is the command related to the second voice in step 1601, the third voice recognition processor 190 updates the second voice recognition model storage unit 222 by making the corresponding command correspond to the recognized second voice in step 1602.

When a command for starting the reproduction of a video is configured as "Start" among video player application functions which can reproduce the video, if it is determined that the command related to and/or similar to the recognized "Begin" is "Start", the third voice recognition processor 190 may update the second voice recognition model storage unit 222 by making the recognized "Begin" correspond to "Start". That is, the third voice recognition processor 190 may further add and store "Begin" as well as "Start" in the command for starting the reproduction of the video among the video player application functions that can reproduce the video.

When there is no command related to the second voice in step 1601, the third voice recognition processor 190 determines whether there is a device function related to the second voice in step 1603. For example, when the video player application is being executed and the second voice corresponds to "stop", the third voice recognition processor 190 may determine whether there is a video player function related to "stop".

When there is the device function related to the second voice in step 1603, the third voice recognition processor 190 updates the second voice recognition model storage unit 222 by making the corresponding device function correspond to the recognized second voice in step 1604.

For example, when the video player function related to "stop" is "reproduction stop", the third voice recognition processor 190 may configure and store "stop" as a command for performing the "reproduction stop" function.

When there is the device function related to the second voice in step 1603, the command update operation is terminated.

As described above, the first voice recognition processor, the second voice recognition processor, and the third voice recognition processor may perform voice recognition even when an application is being executed and/or the electronic device is in an idle mode. In order to reduce consumption of standby power, the first voice recognition processor, the second voice recognition processor, and the third voice recognition processor may recognize only a wake-up command (for example, "Hi Galaxy") in the idle mode, but still recognize all commands when not in the idle mode.

Further, when "Hi Galaxy" is received while a predetermined application is executed, the first voice recognition processor 170 and/or the second voice recognition processor 180 may execute an application that performs natural language voice recognition and recognizes the received "Hi Galaxy". Thereafter, when "open camera" is received, the first voice recognition processor 170 may transfer "open camera" to the third voice recognition processor 190.

When a result of the recognition is received from the third voice recognition processor 190, the first voice recognition processor 170 may execute a camera application according to the recognition result. Further, the second voice recognition processor 180 may recognize the received "open camera" and execute the camera application.

When "Hi Galaxy" is received while a music player application is executed by the second voice recognition processor, the first voice recognition processor 170 and/or the second voice recognition processor 180 may execute an application that performs natural language voice recognition and recognizes the received "Hi Galaxy". Thereafter, when "open camera" is received, the first voice recognition processor 170 may transfer "open camera" to the third voice recognition processor 190.

When a result of the recognition is received from the third voice recognition processor 190, the first voice recognition processor 170 may execute a camera application according to the recognition result. Further, the second voice recognition processor 180 may recognize the received "open camera" and execute the camera application.

When a command of "play", "pause", "next", etc., which is designated to control the music player application, is input, the second voice recognition processor 180 may recognize the input and perform a function of the related music player application.

Figure 17:
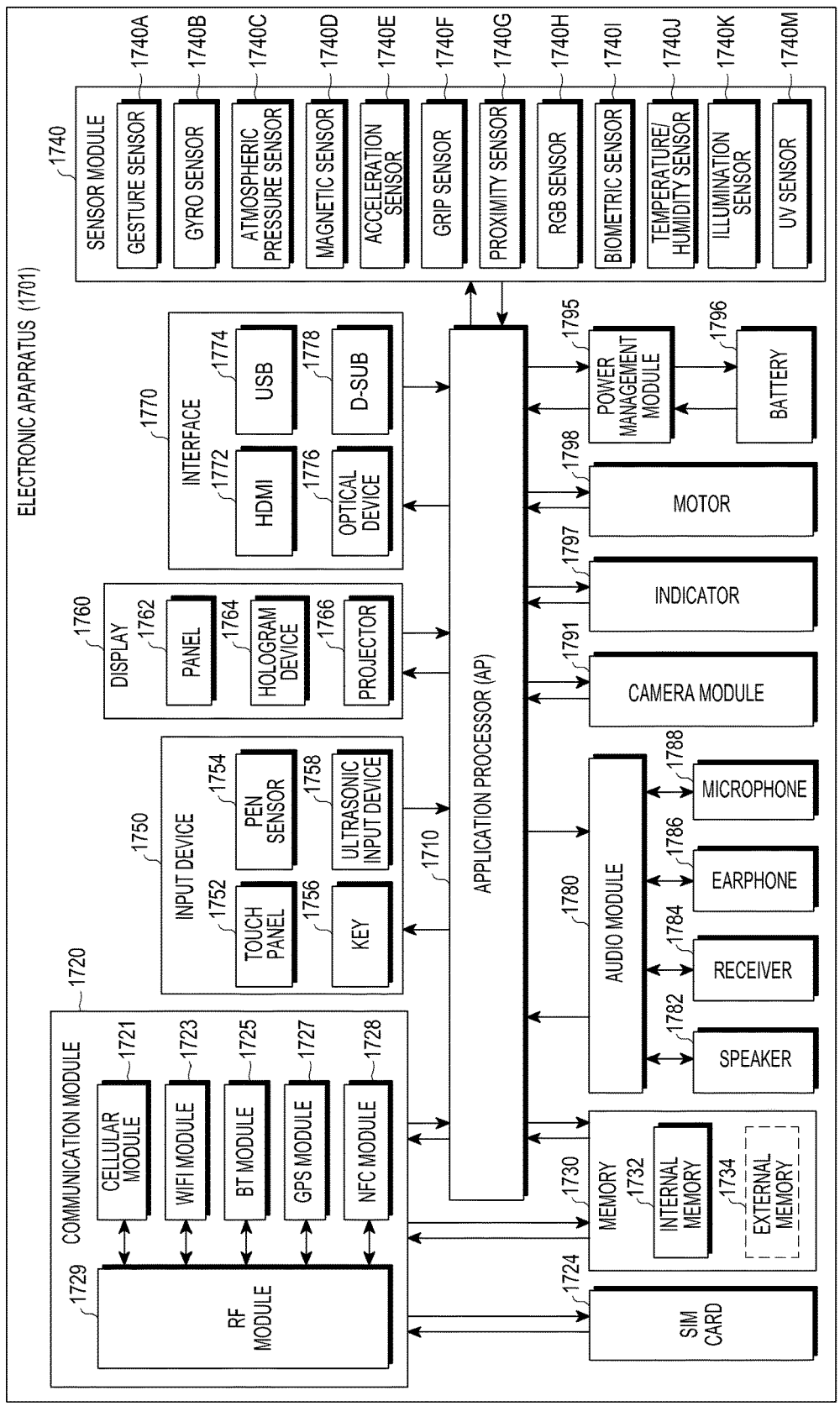
FIG. 17 illustrates an electronic device according to an embodiment of the present disclosure.

FIG. 17 illustrates an electronic device according to an embodiment of the present disclosure.

Referring to FIG. 17, the electronic device 1701 includes an Application Processor (AP) 1710, a communication module 1720, a Subscriber Identifier Module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The AP 1710 may control a plurality of hardware or software components connected thereto by driving an operating system or an application program, process various types of data including multimedia data, and perform calculations. The AP 1710 may be implemented by, for example, a System on Chip (SoC). The AP 1710 may further include a Graphic Processing Unit (GPU).

The communication module 1720 may perform data transmission/reception in communication between the electronic device 1701 and other electronic devices connected thereto through a network. The communication module 1720 includes a cellular module 1721, a Wi-Fi module 1723, a BT module 1725, a GPS module 1727, an NFC module 1728, and a Radio Frequency (RF) module 1729.

The cellular module 1721 may provide a voice call, a video call, a text service, an Internet service, etc., through a communication network (for example, LTE, LTE-A, CDMA, WCDMA, UMTS, WiBro, GSM, etc.). Further, the cellular module 1721 may distinguish and authenticate electronic devices within a communication network using the SIM card 1724. The cellular module 1721 may perform at least some of the functions which may be provided by the AP 1710. For example, the cellular module 1721 may perform at least some of the multimedia control functions.

The cellular module 1721 may include a Communication Processor (CP). Further, the cellular module 1721 may be implemented by, for example, an SoC. Although the elements such as the cellular module 1721, the memory 1730, and the power management module 1795 are illustrated separately from the AP 1710 in FIG. 17, the AP 1710 may be implemented to include at least some of the above described elements (for example, the cellular module 1710).

The AP 1710 or the cellular module 1721 may load a command or data received from at least one of a non-volatile memory and other elements connected to each of the AP 1710 and the cellular module 1721 to a volatile memory and process the loaded command or data. Further, the AP 1710 or the cellular module 1721 may store data received from at least one of other elements or created by at least one of other elements in a non-volatile memory.

Each of the Wi-Fi module 1723, the BT module 1725, the GPS module 1727, and the NFC module 1728 may include a processor for processing data transmitted/received through the corresponding module. Although the cellular module 1721, the Wi-Fi module 1723, the BT module 1725, the GPS module 1727, and the NFC module 1728 are illustrated as individual blocks in FIG. 17, at least two or more of the cellular module 1721, the Wi-Fi module 1723, the BT module 1725, the GPS module 1727, and the NFC module 1728 may be included within one Integrated Chip (IC) or one IC package. For example, at least some of processors corresponding to the cellular module 1721, the Wi-Fi module 1723, the BT module 1725, the GPS module 1727, and the NFC module 228 (for example, a communication processor corresponding to the cellular module 1721 and a Wi-Fi processor corresponding to the Wi-Fi module 1723) may be implemented as one SoC.

The RF module 1729 may transmit/receive data, for example, an RF signal. The RF module 1729 may include a transceiver, a Power Amp Module (PAM), a frequency filter, a Low Noise Amplifier (LNA), etc. The RF module 1729 may also include a component, such as a conductor, a conductive wire, etc., for transmitting/receiving an electromagnetic wave in a free space in wireless communication. Although the cellular module 1721, the Wi-Fi module 1723, the BT module 1725, the GPS module 1727, and the NFC module 1728 are illustrated as sharing the RF module 1729 in FIG. 17, at least one of the cellular module 1721, the Wi-Fi module 1723, the BT module 1725, the GPS module 1727, and the NFC module 1728 may transmit/receive the RF signal through a separate RF module.

The SIM card 1724 may be inserted into a slot formed in a particular portion of the electronic device. The SIM card 1724 may include unique identification information (for example, an Integrated Circuit Card Identifier (ICCID)) or subscriber information (for example, an International Mobile Subscriber Identity (IMSI)).

The memory 1730 includes an internal memory 1732 and an external memory 1734. The internal memory 1732 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, etc.).

The internal memory 1732 may be a Solid State Drive (SSD).

The external memory 1734 may further include a flash drive, for example, a Compact Flash (CF), a Secure Digital (SD), a Micro Secure Digital (Micro-SD), a Mini Secure Digital (Mini-SD), an extreme Digital (xD), a memory stick, etc. The external memory 1734 may be functionally connected to the electronic device 1701 through various interfaces.

The electronic device 1701 may further include a storage device (or storage medium) such as a hard drive.

The sensor module 1740 may measure a physical quantity or detect an operation state of the electronic device 1701, and may convert the measured or detected information to an electrical signal. The sensor module 1740 includes a gesture sensor 1740A, a gyro sensor 1740B, an atmospheric pressure sensor 1740C, a magnetic sensor 1740D, an acceleration sensor 1740E, a grip sensor 1740F, a proximity sensor 1740G, a color sensor 1740H (for example, a red, green, and blue (RGB) sensor), a biometric sensor 1740I, a temperature/humidity sensor 1740J, an illumination sensor 1740K, and an Ultra Violet (UV) sensor 1740M.

Additionally or alternatively, the sensor module 1740 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, etc. The sensor module 1740 may further include a control circuit for controlling at least one sensor included therein.

The input device 1750 includes a touch panel 1752, a (digital) pen sensor 1754, a key 1756, and an ultrasonic input device 1758. The touch panel 1752 may recognize a capacitive type, a resistive type, an infrared type, and/or an ultrasonic type of touch input. The touch panel 1752 may further include a control circuit. A capacitive type touch panel may recognize a physical contact or proximity. The touch panel 1752 may further include a tactile layer that provides a tactile reaction to a user.

The (digital) pen sensor 1754 may be implemented using a method identical or similar to a method of receiving a touch input of a user, or using a separate recognition sheet.

The key 1756 may include a physical button, an optical key, or a keypad.

The ultrasonic input device 1758 is a device that may sense an ultrasonic signal of a sound wave generated by an input tool through the microphone 1788 of the electronic device 1701, and identify data, and is capable of performing wireless recognition.

The electronic device 1701 may also receive a user input from an external device (for example, a computer or server) connected thereto, using the communication module 1720.

The display 1760 includes a panel 1762, a hologram device 1764, and a projector 1766.

The panel 1762 may be a Liquid Crystal Display (LCD), Active-Matrix Organic Light Emitting Diode (AM-OLED), etc. The panel 1762 may be implemented to be flexible, transparent, or wearable. The panel 1762 and the touch panel 1752 may be configured together as a single module.

The hologram device 1764 may show a stereoscopic image in the air by using interference of light.

The projector 1766 may project light onto a screen to display an image. For example, the screen may be located inside or outside the electronic device 1701.

The display 1760 may also include a control circuit for controlling the panel 1762, the hologram device 1764, and/or the projector 1766.

The interface 1770 includes an HDMI 1772, a USB 1774, an optical interface 1776, and a D-subminiature (D-sub) 1778.

Additionally or alternatively, the interface 1770 may include a Mobile High-definition Link (MHL) interface, a Secure Digital (SD) card/Multi-Media Card (MMC) interface, and/or an Infrared Data Association (IrDA) standard interface.

The audio module 1780 may bidirectionally convert a sound and an electric signal. The audio module 1780 may process sound information input or output through a speaker 1782, a receiver 1784, earphones 1786, the microphone 1788, etc.

The camera module 1791 may photograph a still image and a video. The camera module 1791 may include one or more image sensors (for example, a front sensor or a rear sensor), a lens, an Image Signal Processor (ISP), and/or a flash (for example, an LED or xenon lamp).

The power management module 1795 may manage power of the electronic device 1701. The power management module 1795 may include a Power Management Integrated Circuit (PMIC), a charger Integrated Circuit (IC), and/or a battery gauge.

For example, the PMIC may be mounted within an integrated circuit or an SoC semiconductor.

Charging methods may be classified into a wired charging method and a wireless charging method. The charger IC may charge a battery and prevent over voltage or over current from a charger. The charger IC may include a charger IC for at least one of the wired charging method and the wireless charging method. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure the remaining amount of battery, a charging voltage and current, and/or temperature.

The battery 1796 may store or generate electricity, and may supply power to the electronic device 1701 by using the stored or generated electricity. The battery 1796 may include a rechargeable battery or a solar battery.

The indicator 1797 may display a particular status of the electronic device 1701 or a part thereof (for example, the AP 1710), such as a booting status, a message status, a charging status, etc.

The motor 1798 may convert an electric signal to a mechanical vibration.

The electronic device 1701 may also include a processing device (for example, a GPU) for supporting mobile TV. The processing device for supporting the mobile TV may process media data according to a standard such as Digital Multimedia Broadcasting (DMB), Digital Video Broadcasting (DVB), media flow, etc.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device may be combined to form a single entity, and thus, may equivalently execute functions of the corresponding elements prior to the combination.

The term "module" used herein may refer to, for example, a unit including one or more combinations of hardware, software, and firmware. The term "module" may be interchangeable with "unit", "logic", "logical block", "component", or "circuit".

A "module" may be the smallest unit of an integrated component or a part thereof. A "module" may be a minimum unit for performing one or more functions or a part thereof. A "module" may be mechanically or electronically implemented. For example, a module according to an embodiment of the present disclosure may include at least one of an Application-Specific Integrated Circuit (ASIC) chip, a Field-Programmable Gate Arrays (FPGA), and a programmable-logic device for performing various operations.

At least some of the devices (e.g., modules or functions thereof) or methods (e.g., operations) of the present disclosure may be implemented as instructions stored computer readable storage media in the form of programming modules. When the command is executed by one or more processors (for example, the processor 210), the one or more processors may execute a function corresponding to the command.

The computer-readable storage medium may be, for example, the memory 130.

At least some of the programming modules may be implemented (or executed) by the processor 210.

At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory.

In addition, the program instructions may include high class language codes, which can be executed in a computer by using an interpreter, as well as machine codes made by a compiler.

The aforementioned hardware device may be configured to operate as one or more software modules in order to perform the operation of various embodiments of the present invention, and vice versa.

A module or a programming module according to the present disclosure may include at least one of the described component elements, a few of the component elements may be omitted, or additional component elements may be included. Operations executed by a module, a programming module, or other component elements according to various embodiments of the present invention may be executed sequentially, in parallel, repeatedly, or in a heuristic manner.

Further, some operations may be executed in a different order or may be omitted, or other operations may be added.

According to various embodiments of the present invention, it is possible to maintain a voice recognition system capable of having low power consumption and always being in a standby state, to perform natural voice recognition which can respond to various queries of a user, to respond to a particular voice command for an application requiring a rapid operation reaction, and to perform voice recognition having a high voice recognition rate even though a voice signal input for the voice recognition is distorted.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

The invention claimed is:

1. A method of performing voice recognition by an electronic device including a first voice recognition device and a second voice recognition device, the method comprising:
when an audio signal is not output from the electronic device, receiving a first voice by the first voice recognition device of the electronic device;
when an audio signal is output from the electronic device, receiving the first voice by the second voice recognition device of the electronic device;
when the first voice is received by the first voice recognition device and the first voice recognition device recognizes a predetermined command in the first voice, transferring a received second voice to an external electronic device and receiving a result of recognizing the received second voice from the external electronic device; and
when the first voice is received by the second voice recognition device and the second voice recognition device recognizes the predetermined command in the first voice, recognizing a second command in the received second voice, and performing an operation based on the recognized second command.

2. The method of claim 1, further comprising performing an operation based on the received second voice recognized by the external electronic device.

3. The method of claim 1, further comprising:
when the first voice is received by the first voice recognition device and the first voice recognition device does not recognize the predetermined command in the first voice, transferring the first voice to the second voice recognition device; and
when the first voice is transferred to the second voice recognition device, the second voice recognition device recognizes the predetermined command in the first voice, and the second voice recognition device recognizes the second command in the received second voice, performing the operation based on the recognized second command.

4. The method of claim 3, further comprising:
when the first voice is received by the first voice recognition device, the first voice recognition device recognizes the predetermined command in the first voice, and the second voice is received by the first voice recognition device, transferring the received second voice to a third voice recognition device; and
performing an operation based on the received second voice recognized by the third voice recognition device.

5. A method of performing voice recognition by an electronic device including a first voice recognition device and a second voice recognition device, the method comprising:
executing a predetermined application;
receiving a first voice for the application;
when an audio signal is not output from the electronic device, activating the first voice recognition device of the electronic device;
when an audio signal is output from the electronic device, receiving the first voice by the second voice recognition device of the electronic device;
when the first voice recognition device of the electronic device is activated and the first voice recognition device recognizes a predetermined command in the first voice, transferring a received second voice to an external electronic device and receiving a result of recognizing the received second voice from the external electronic device; and
when the first voice is received by the second voice recognition device, performing the voice recognition by the second voice recognition device, and when the second voice recognition device recognizes the predetermined command in the first voice, recognizing a second command in the received second voice, and performing an operation based on the recognized second command.

6. The method of claim 5, further comprising, when the first voice recognition device is activated and the first voice recognition device does not recognize the predetermined command in the first voice, performing an operation based on another command.

7. The method of claim 5, further comprising, when the second voice recognition device does not recognize the predetermined command in the first voice, performing an operation based on another command.

8. The method of claim 5, further comprising:
recognizing the second voice by a third voice recognition device; and
when a command related to the second voice is included in a command set, updating the command set based on the second voice.

9. The method of claim 8, further comprising, when the command related to the second voice is not included in the command set and there is a device function related to the second voice, updating the device function related to the second voice based on the second voice.

10. An electronic device comprising:
a first voice recognition device of the electronic device; and
a second voice recognition device of the electronic device,
wherein when an audio signal is not output from the electronic device, a first voice is received by the first voice recognition device of the electronic device,
wherein when an audio signal is output from the electronic device, the first voice is received by the second voice recognition device of the electronic device,
wherein when a first voice is received by the first voice recognition device and the first voice recognition device recognizes a predetermined command in the first voice, the first voice recognition device transfers a received second voice to an external electronic device and receives a result of recognizing the received second voice from the external electronic device, and
wherein when the first voice is received by the second voice recognition device and the second voice recognition device recognizes the predetermined command in the first voice, the second voice recognition device recognizes a second command in the received second voice, and performs an operation based on the recognized second command.

11. The electronic device of claim 10, wherein first voice recognition device performs an operation based on the received second voice recognized by the external electronic device.

12. The electronic device of claim 10, wherein when the first voice is received by the first voice recognition device and the first voice recognition device does not recognize the predetermined command in the first voice, the first voice recognition device transfers the first voice to the second voice recognition device, and
wherein when the first voice is transferred to the second voice recognition device, the second voice recognition device recognizes the predetermined command in the first voice, and the second voice recognition device recognizes the second command in the received second voice, the second voice recognition device performs the operation based on the recognized second command.

13. The electronic device of claim 12, wherein when the first voice is transferred to the second voice recognition device, the second voice recognition device recognizes the predetermined command in the first voice, and the second voice recognition device does not recognize the second command in the received second voice, the second voice recognition device transfers the received second voice to a third voice recognition device and performs an operation based on the second voice recognized by the third voice recognition device,
wherein the electronic device comprises at least one storage unit which stores at least one voice recognition model to recognize the predetermined command.

14. An electronic device comprising:
a first voice recognition device of the electronic device;
a second voice recognition device of the electronic device; and
a processor configured for:
executing a predetermined application,
when an audio signal is not output from the electronic device, activating the first voice recognition device of the electronic device, and
when an audio signal is output from the electronic device, receiving the first voice by the second voice recognition device of the electronic device,
wherein when the first voice recognition device is activated and the first voice recognition device recognizes a predetermined command in the first voice, the first voice recognition device transfers a received second voice to an external electronic device and receives a result of recognizing the received second voice from the external electronic device; and
wherein when the first voice is received by the second voice recognition device, the second voice recognition device performs the voice recognition, and when the second voice recognition device recognizes the predetermined command in the first voice, the second voice recognition device recognizes a second command in the received second voice and performs an operation based on the recognized second command.

15. The electronic device of claim 14, wherein when the first voice recognition device is activated and the first voice recognition device does not recognize the predetermined command in the first voice, the first voice recognition device performs an operation based on another command.

16. The electronic device of claim 14, wherein when the second voice recognition device does not recognize the predetermined command in the first voice, the first voice recognition device performs an operation based on another command.

17. The electronic device of claim 14, further comprising a third voice recognition device that determines whether a command related to the second voice is included in a command set, and when the command related to the received second voice is included in the command set, updates the command set based on the received second voice.

18. The electronic device of claim 17, wherein when the command related to the second voice is not included in the command set and there is a device function related to the second voice, the third voice recognition device updates the device function related to the received second voice based on the received second voice.

19. A non-transitory computer-readable recording medium storing commands, the computer-readable recording medium having a program recorded therein to execute operations of a first voice recognition device of the electronic device and a second voice recognition device of the electronic device, the operations comprising:
when an audio signal is not output from the electronic device, receiving a first voice by the first voice recognition device;
when an audio signal is output from the electronic device, receiving the first voice by the second voice recognition device of the electronic device;
when the first voice is received by the first voice recognition device and the first voice recognition device recognizes a predetermined command in the first voice, transferring a received second voice to an external electronic device and receiving a result of recognizing the received second voice from the external electronic device; and
when the first voice is received by the second voice recognition device and the second voice recognition device recognizes the predetermined command in the first voice, recognizing a second command in the received second voice, and performing an operation based on the recognized second command.

20. A non-transitory computer-readable recording medium for executing operations of a first voice recognition device and a second voice recognition device, the operations comprising:
executing a predetermined application;
receiving a first voice for the application;
when an audio signal is not output from the electronic device, activating the first voice recognition device of the electronic device;
when an audio signal is output from the electronic device, receiving the first voice by the second voice recognition device of the electronic device;
when the first voice recognition device of the electronic device is activated and the first voice recognition device recognizes a predetermined command in the first voice, transferring a received second voice to an external electronic device and receiving a result of recognizing the received second voice from the external electronic device; and
when the first voice is received by the second voice recognition device, performing the voice recognition by the second voice recognition device, and when the second voice recognition device recognizes the predetermined command in the first voice, recognizing a second command in the received second voice, and performing an operation based on the recognized second command.

\* \* \* \* \*